(12) United States Patent
Kim

(10) Patent No.: US 11,186,137 B2
(45) Date of Patent: Nov. 30, 2021

(54) HEAT PUMP SYSTEM FOR VEHICLE

(71) Applicants: Hyundai Motor Company, Seoul (KR); Kia Motors Corporation, Seoul (KR)

(72) Inventor: Jae Yeon Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 61 days.

(21) Appl. No.: 16/896,063

(22) Filed: Jun. 8, 2020

(65) Prior Publication Data

US 2021/0138867 A1 May 13, 2021

(30) Foreign Application Priority Data

Nov. 12, 2019 (KR) .................. 10-2019-0143946

(51) Int. Cl.
*F25B 7/00* (2006.01)
*B60H 1/00* (2006.01)
*B60H 3/02* (2006.01)

(52) U.S. Cl.
CPC ..... *B60H 1/00278* (2013.01); *B60H 1/00385* (2013.01); *B60H 3/024* (2013.01); *B60H 2001/00307* (2013.01)

(58) Field of Classification Search
CPC ....................... B60H 1/00278; B60H 1/00385; B60H 3/024; B60H 2001/00307
USPC .......................................................... 62/79
See application file for complete search history.

(56) References Cited

U.S. PATENT DOCUMENTS

| | | | |
|---|---|---|---|
| 6,705,101 B2 | 3/2004 | Brotz et al. | |
| 8,215,432 B2 | 7/2012 | Nemesh et al. | |
| 8,899,062 B2 | 12/2014 | Kadle et al. | |
| 8,997,503 B2* | 4/2015 | Morisita | B60H 1/00392 62/79 |
| 9,109,840 B2 | 8/2015 | Kadle et al. | |
| 9,239,193 B2 | 1/2016 | Kadle et al. | |
| 2010/0012295 A1* | 1/2010 | Nemesh | H01M 10/663 165/104.19 |
| 2013/0283838 A1 | 10/2013 | Kadle et al. | |
| 2015/0217622 A1* | 8/2015 | Enomoto | B60H 1/00278 165/42 |

FOREIGN PATENT DOCUMENTS

| | | |
|---|---|---|
| CN | 103380339 B | 1/2016 |
| JP | 5336033 B2 | 11/2013 |

* cited by examiner

*Primary Examiner* — Davis D Hwu
(74) *Attorney, Agent, or Firm* — Slater Matsil, LLP

(57) ABSTRACT

A heat pump system for a vehicle includes a cooling apparatus including a radiator, a first water pump, a first valve, and a reservoir tank, a battery cooling apparatus including a battery coolant line connected to the reservoir tank through a second valve, a second water pump and a battery module, a chiller in a first branch line and connected to the battery coolant line through the second valve, a heating apparatus including a first connection line connected to the coolant line through a second valve, and a third water pump and a heater in the first connection line, an air conditioner including a second connection line connected to the battery coolant line through a fourth valve, and a fourth water pump and a cooler in the second connection line, and a centralized energy device connected to the first and second connection lines.

20 Claims, 11 Drawing Sheets

HEAT PUMP SYSTEM FOR VEHICLE

CROSS-REFERENCE TO RELATED APPLICATIONS

This application claims priority to Korean Patent Application No. 10-2019-0143946, filed in the Korean Intellectual Property Office on Nov. 12, 2019, which application is hereby incorporated herein by reference.

TECHNICAL FIELD

The present invention relates to a heat pump system for a vehicle.

BACKGROUND

Generally, an air conditioner system for a vehicle includes an air conditioner for circulating a refrigerant to heat or cool an interior of the vehicle.

The air conditioner, which can maintain a fresh indoor condition by maintaining an indoor temperature of a vehicle at an appropriate temperature regardless of an outdoor temperature change, is configured to heat or cool an interior of the vehicle by heat-exchange by a condenser and an evaporator during a process in which a refrigerant discharged by driving a compressor is circulated to the compressor again by passing through a condenser, a receiver drier, an expansion valve, and the evaporator.

That is, in the air conditioner, a high-temperature and high-pressure gaseous refrigerant compressed by the compressor is condensed through the condenser, then is evaporated by the evaporator through the receiver drier and the expansion valve to lower the indoor temperature and humidity in a summer cooling mode.

Recently, as concerns about energy efficiency and environmental pollution have gradually increased, development of an environmentally friendly vehicle capable of being substantially substituted for a vehicle having an internal combustion engine has been required, and the environmentally friendly vehicles are typically classified into an electric vehicle which is typically driven using a fuel cell or electricity as a power source, and a hybrid vehicle which is driven using an engine and an electric battery.

In the electric vehicle and the hybrid vehicle of the environmentally friendly vehicles, a separate heater is not used, unlike a general vehicle that uses an air conditioner, and an air conditioner which is applied to the environmentally friendly vehicle is typically referred to as a heat pump system.

In a case of the electric vehicle using the fuel cell, chemical reaction energy of oxygen and hydrogen is converted into electrical energy to generate driving force, and during this process, heat energy is generated by chemical reaction in the fuel cell, and as a result, effective removal of the generated heat is required to secure the performance of the fuel cell.

Even in the hybrid vehicle, the driving force is generated by driving the motor by using electricity supplied from the fuel cell or the electric battery together with the engine that is actuated with a general fuel, and as a result, the performance of the motor can be secured only by effectively removing the heat generated from the fuel cell or the battery, and the motor.

Accordingly, in a hybrid vehicle or electric vehicle of a prior art, a battery cooling system, a cooling part, and a heat pump system should be configured to have respective separate circuits to prevent heat generation of a motor, an electrical component, and a battery including a fuel cell.

Thus, the size and weight of a cooling module disposed in the front of the vehicle are increased, and a layout of connection pipes for supplying a refrigerant or coolant to the heat pump system, the cooling apparatus, and the battery cooling system in an engine compartment becomes complicated.

In addition, since a battery cooling system for heating and cooling the battery depending on a vehicle state is separately provided to enable the battery to output optimal performance, a plurality of valves for connection pipes are employed, and thereby ride comfort may be deteriorated since noise and vibration due to frequent opening and closing operations may be transmitted to an interior of the vehicle.

The above information disclosed in this Background section is only for enhancement of understanding of the background of the invention, and therefore it may contain information that does not form the prior art that is already known to a person of ordinary skill in the art.

SUMMARY

The present invention relates to a heat pump system for a vehicle. Particular embodiments relate to a heat pump system for a vehicle for cooling or heating an inside of the vehicle selectively using a coolant of a high temperature or a coolant of a low temperature.

Embodiments of the present invention have been made in an effort to provide a heat pump system for a vehicle having advantages of selectively heat-exchanging heat energy generated from a coolant with a coolant upon condensing and evaporation of the coolant to control an internal temperature of the vehicle using the heat-exchanged coolant of a low temperature or a high temperature.

An exemplary embodiment of the present invention provides a heat pump system for a vehicle, which adjusts a temperature of a battery module by using one chiller that performs heat exchange between a refrigerant and a coolant and improves the heating efficiency of the vehicle using a waste heat of an electrical component and a battery module.

A heat pump system for a vehicle according to an exemplary embodiment of the present invention includes a cooling apparatus including a radiator, a first water pump, a first valve, and a reservoir tank which are connected through a coolant line, configured to circulate a coolant in the coolant line to cool at least one electrical component provided in the coolant line, a battery cooling apparatus including a battery coolant line connected to the reservoir tank through a second valve, and a second water pump and a battery module which are connected through the battery coolant line to circulate the coolant in the battery module, a chiller provided in a first branch line that is connected to the battery coolant line through the second valve, through which a refrigerant passes, to adjust a temperature of the coolant by performing heat-exchange between the coolant that is selectively introduced into a second branch line connecting the coolant line and the first branch line through the first valve, and the first branch line and the refrigerant, a heating device including a first connection line connected to the coolant line through a second valve, and a third water pump and a heater provided in the first connection line so as to heat the interior of the vehicle using a coolant, an air conditioner including a second connection line connected to the battery coolant line through a fourth valve, and a fourth water pump and a cooler provided in the second connection line so as to cool the interior of the vehicle using a coolant, and a centralized energy device connected to the first and second connection lines in order to supply a coolant of a low temperature to the an air conditioner, and to supply a coolant of a high temperature to the heating apparatus, and to selectively heat-exchange heat energy generated upon condensing and evaporation of a refrigerant circulating an inside with the coolant.

A first end of the second branch line may be connected to the coolant line through the first valve and a second end of the second branch line may be connected to the first branch line between the second valve and the chiller, and the heater and the cooler may be provided inside an HVAC module.

When the battery module is heated, the second branch line may be opened through an operation of the first valve. In the cooling apparatus, on the basis of the second branch line, the coolant line connected to the radiator may be closed and the coolant that has passed through the electrical component circulates along the opened second branch line and the coolant line without passing the radiator through an operation of the first water pump. A portion of the first branch line may be connected to the second branch line, and the battery coolant line connected to the reservoir tank may be closed based on the first branch line. In the battery cooling apparatus, the coolant may be circulated along the battery coolant line and a portion of the first branch line through an operation of the second water pump in the state in which the reservoir tank and the battery coolant line are connected through an operation of the second valve. In the heating apparatus, the coolant line and the first connection line may be connected through an operation of the third valve, and in the cooling apparatus, the coolant with the increased temperature by the waste heat of the electrical component circulates to the first connection line through the operation of the third water pump. A high-temperature coolant flowing into the coolant line from the first connection line may flow into the first branch line from the coolant line through the second branch line, and is supplied to the battery module connected to the battery coolant line through the first branch line.

The HVAC module may include an opening and closing door provided between the heater and the cooler and configured to control outside air passing through the evaporator to be selectively introduced into the heater depending on cooling, heating, and heating and dehumidifying modes of the vehicle therein.

The HVAC module may further include an air heater provided at an opposite side of the cooler, with the heater interposed therebetween to selectively heat outside air passing through the heater.

The air heater may be operated to raise a temperature of the outside air passing through the heater when a temperature of a coolant supplied to the heater is lower than a target temperature for interior heating.

The centralized energy device may include a condenser that circulates a refrigerant therein, is provided in the first connection line between the third valve and the heater, condenses the refrigerant through heat-exchange between the refrigerant and the coolant, and increases a temperature of the coolant, an expansion valve connected to the condenser through the refrigerant line, an evaporator that is connected to the expansion valve through the refrigerant line, is provided on the second connection line between the fourth valve and the cooler, evaporates the refrigerant through heat-exchange between the refrigerant and the coolant, and lowers a temperature of the coolant, a compressor that is provided on the refrigerant line between the evaporator and the condenser, and an accumulator that is provided on the refrigerant line between the evaporator and the compressor, wherein the chiller is provided on the refrigerant line between the evaporator and the accumulator.

In the heating mode of the vehicle, the condenser may condense the refrigerant by heat-exchange between the coolant circulating the first connection line and the high-temperature refrigerant supplied from the compressor, and may supply a high-temperature coolant to the heater through the first connection line.

In the cooling mode of the vehicle, the evaporator may heat-exchange a coolant circulating the second connection line with an internally evaporated refrigerant of a low temperature to cool the coolant, and may supply a low-temperature coolant to the cooler through the second connection line.

When cooling the battery module in the cooling mode of the vehicle, in the cooling apparatus, the coolant may be circulated in the coolant line through an operation of the first water pump, and the second connection line may be closed through an operation of the first valve. In the battery cooling apparatus, the first branch line may be opened through an operation of the second valve, a portion of the battery coolant line connected to the reservoir tank may be closed based on the first branch line, and the coolant having passed through the chiller may be supplied to the battery module along the battery coolant line and the first branch line through an operation of the second water pump. In the heating apparatus, the coolant line and the first connection line may be connected through an operation of the third valve such that the coolant is supplied from the cooling apparatus. The coolant may be circulated along the first connection line through an operation of the third water pump. In the air conditioner, the second connection line may form an independent closed circuit that is independent of the battery coolant line through an operation of the fourth valve. The coolant may be circulated along the second connection line through an operation of the fourth water pump, and a low-temperature coolant passing through the evaporator may be supplied to the cooler. In the centralized energy device, each constituent element may operate such that the refrigerant is circulated along the refrigerant line.

The coolant circulating the heating apparatus may be supplied to the condenser along the first connection line so that the condenser condenses the refrigerant through heat-exchange with the coolant, and the coolant circulating the air conditioner may be supplied to the evaporator along the second connection line so that the evaporator evaporates the refrigerant through heat-exchange with the coolant.

When rapidly charging the battery module in the cooling mode of the vehicle, in the cooling apparatus, the coolant may be circulated in the coolant line through the operation of the first water pump. In the battery cooling apparatus, the first branch line may be opened through an operation of the second valve, a portion of the battery coolant line connected to the reservoir tank may be closed on the basis of the first branch line, and the coolant having passed through the chiller may be supplied to the battery module along the battery coolant line and the first branch line through an operation of the second water pump. In the heating apparatus, the coolant line and the first connection line may be connected through an operation of the third valve such that the coolant is supplied from the cooling apparatus, and the coolant is circulated along the first connection line through an operation of the third water pump. In the air conditioner, the second connection line may be connected to the battery coolant line through an operation of the fourth valve, the coolant may be supplied from the battery cooling apparatus, and the coolant may be circulated along the second connection line through an operation of the fourth water pump. In the centralized energy device, each constituent element may operate such that the refrigerant is circulated along the refrigerant line.

When recovering the waste heat of the electrical component in the heating mode of the vehicle, the second branch line may be opened through an operation of the first valve. In the cooling apparatus, on the basis of the second branch line, a portion of the coolant line connected to the radiator and a portion of the coolant line connecting the radiator and the reservoir tank may be closed, a portion of the first branch line connected to the second branch line may be opened, and a remaining portion of the battery coolant line except for the battery coolant line connected to the reservoir tank based on the first branch line may be closed. The battery cooling apparatus may be stopped, the coolant line and the first connection line may form an independent closed circuit through an operation of the third valve, the coolant whose temperature is increased while passing through the electrical component through the operation of the first water pump may be supplied to the chiller along the second branch line and a portion of the opened first branch line without passing through the radiator, and the coolant discharged from the chiller may be flowed into the reservoir tank through the first branch line and the opened battery coolant line. In the heating apparatus, the coolant may be circulated along the first connection line through an operation of the third water pump. In the centralized energy device, each constituent element may operate such that the refrigerant is circulated along the refrigerant line, and the air conditioner may be stopped.

When recovering the waste heat of the battery module in the heating mode of the vehicle, the second branch line may be opened through an operation of the first valve. In the cooling apparatus, on the basis of the second branch line, a portion of the coolant line connected to the radiator and a portion of the coolant line connecting the radiator and the reservoir tank may be closed, a portion of the first branch line connected to the second branch line may be opened, and a remaining of the battery coolant line except for the battery coolant line connected to the reservoir tank based on the first branch line may be closed. The battery cooling apparatus may be stopped. The coolant line and the first connection line may form an independent closed circuit through an operation of the third valve. The coolant whose temperature is increased while passing through the electrical component through the operation of the first water pump may be supplied to the chiller along the second branch line and a portion of the opened first branch line without passing through the radiator. The coolant discharged from the chiller may be flowed into the reservoir tank through the first branch line and the opened battery coolant line. In the heating apparatus, the coolant may be circulated along the first connection line through an operation of the third water pump. In the centralized energy device, each constituent element may operate such that the refrigerant is circulated along the refrigerant line, and the air conditioner may be stopped.

In a low temperature dehumidification mode of the vehicle, the second branch line may be opened through an operation of the first valve. In the cooling apparatus, on the basis of the second branch line, a portion of the coolant line connected to the radiator and a portion of the coolant line connecting the radiator and the reservoir tank may be closed, a portion of the first branch line connected to the second branch line may be opened, and a remaining portion of the battery coolant line except for the battery coolant line connected to the reservoir tank based on the first branch line may be closed through the operation of the second valve. The battery cooling apparatus may be stopped, the coolant line and the first connection line may form an independent closed circuit through an operation of the third valve, the coolant whose temperature is increased while passing through the electrical component through the operation of the first water pump may be supplied to the chiller along the second branch line and a portion of the opened first branch line without passing through the radiator, and the coolant discharged from the chiller may be flowed into the reservoir tank through the first branch line and the opened battery coolant line. In the heating apparatus, the coolant may be circulated along the first connection line through an operation of the third water pump. In the centralized energy device, each constituent element may operate such that the refrigerant is circulated along the refrigerant line, and in the air conditioner, the coolant may be circulated along the second connection line through an operation of the fourth water pump.

In a high temperature dehumidification mode of the vehicle, the second branch line may be closed through an operation of the first valve. In the cooling apparatus, the coolant may be circulated in the coolant line through an operation of the first water pump, the battery coolant line and the first branch line may be closed through an operation of the second valve, and the battery cooling apparatus may be stopped. In the heating apparatus, the coolant line and the first connection line may be connected through an operation of the third valve such that the coolant is supplied from the cooling apparatus, and the coolant may be circulated along the first connection line through an operation of the third water pump. In the centralized energy device, each constituent element may operate such that the refrigerant is circulated along the refrigerant line, and in the air conditioner, the coolant may be circulated along the second connection line through an operation of the fourth water pump.

When cooling the electrical component and the battery module by using the coolant, the first and second branch lines may be closed through operations of the first and second valves, respectively. The coolant cooled in the radiator and stored in the reservoir tank may be supplied to the electrical component through an operation of the first water pump, and the coolant stored in the reservoir tank may be supplied to the battery module, while circulating through the battery coolant line connected to the coolant line through an operation of the second valve.

When using the waste heat of the electrical component without an operation of the centralized energy device in the heating mode of the vehicle, the second branch line may be opened through an operation of the first valve. In the cooling apparatus, on the basis of the second branch line, a portion of the coolant line connected to the radiator and a portion of the coolant line connecting the radiator and the reservoir tank may be closed, a portion of the first branch line connected to the second branch line may be opened, and a remaining portion of the battery coolant line except for the battery coolant line connected to the reservoir tank based on the first branch line may be closed. The battery cooling apparatus may be stopped. The coolant whose temperature is increased while passing through the electrical component through an operation of the first water pump may be supplied to the heater along the first connection line connected through the third valve, the coolant discharged from the heater may be supplied to the chiller along the first connection line, the third valve, the coolant line, the second branch line, and a portion of the first branch line without passing through the radiator, and the coolant discharged from the chiller may be flowed into the reservoir tank through the first branch line and the opened battery coolant line.

The heating apparatus may include a coolant heater provided in the first connection line between the third water pump and the heater.

The coolant heater may be operated when the temperature of the coolant supplied to the heater is lower than a target temperature in the heating mode and the heating and dehumidification mode of the vehicle, or when the battery module heats.

The first valve may open the coolant line connected to the radiator to allow some of the coolant passing through the electrical component to flow into the second branch line and the remaining coolant to flow into the radiator when the electrical component is overheated in the heating mode.

The first and second valves may be 3-way valves, and the third and fourth valves may be 4-way valves.

The chiller, the condenser, and the evaporator may be a water-cooled heat exchanger into which a coolant flows.

A refrigerant that circulates in the centralized energy device may be an R152-a, R744, or R290 refrigerant.

A heat pump system for a vehicle according to another exemplary embodiment of the present invention is provided. The centralized energy device may include a condenser that circulates a refrigerant therein, is provided in the first connection line between the third valve and the heater, condenses the refrigerant through heat-exchange between the refrigerant and the coolant, and increases a temperature of the coolant, a first expansion valve connected to the condenser through the refrigerant line, an evaporator that is connected to the first expansion valve through the refrigerant line, is provided on the second connection line between the fourth valve and the cooler, evaporates the refrigerant through heat-exchange between the refrigerant and the coolant, and lowers a temperature of the coolant, a compressor that is provided on the refrigerant line between the evaporator and the condenser, and an accumulator that is provided on the refrigerant line between the evaporator and the compressor, wherein the chiller is provided on a refrigerant connection line, a first end of the refrigerant connection line is connected to the refrigerant line between the condenser and the first expansion valve, and a second line of the refrigerant connection line is connected to the accumulator.

The chiller is connected to the refrigerant line in parallel through the refrigerant connection line, and a second expansion valve for expanding while selectively controlling an inflow of the refrigerant to the chiller may be provided in the refrigerant connection line.

As described above, in the heat pump system for a vehicle according to an exemplary embodiment of the present invention, a system may be simplified and a layout of connection pipes in which a coolant circulates may be simplified by selectively heat-exchanging heat energy generated from a refrigerant with a coolant upon condensation and evaporation of the refrigerant to control an internal temperature of the vehicle using the heat-exchanged coolant of a low temperature or a high temperature.

According to embodiments of the present invention, the temperature of the battery module may be adjusted depending on the mode of the vehicle by using one chiller for performing heat exchange between the coolant and the refrigerant, and the interior of the vehicle may be cooled and heated by using the coolant, thereby simplifying the entire system.

Further, embodiments of the present invention may improve heating efficiency of the vehicle using waste heat of an electrical component and a battery module, and may increase the whole travel distance of the vehicle through efficient temperature control of a battery module in order to obtain optimal performance of the battery module.

Moreover, embodiments of the present invention may reduce a size and a weight by packaging a centralized energy module for generating heat energy through condensation and evaporation of a coolant, and may prevent noise, vibration, and operational instability from being generated as compared with an air conditioner according to the related art by using a high performance refrigerant.

In addition, embodiments of the present invention can use the coolant heater applied to the heating apparatus to warm up the battery module or to assist in an interior heating of the vehicle, thereby reducing the cost and weight.

In addition, through the simplification of the entire system, a reduction in production cost and weight is possible, and space utilization may be improved.

DETAILED DESCRIPTION OF ILLUSTRATIVE EMBODIMENTS

Figure 1:
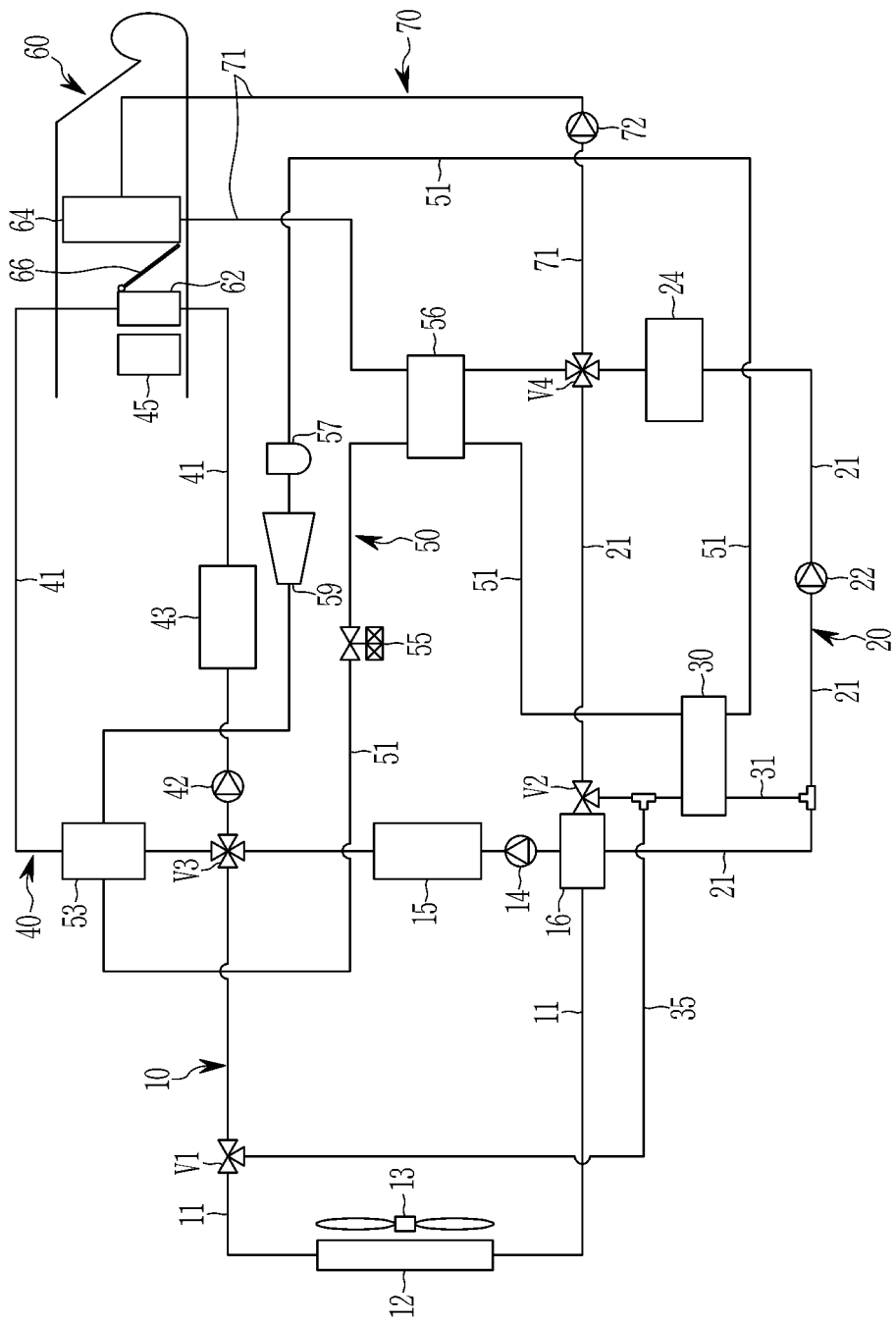
FIG. 1 illustrates a block diagram of a heat pump system for a vehicle according to an exemplary embodiment of the present invention.

Exemplary embodiments of the present invention will hereinafter be described in detail with reference to the accompanying drawings.

Exemplary embodiments disclosed in the present specification and the constructions depicted in the drawings are only the preferred embodiments of the present invention, and do not cover the entire scope of the present invention. Therefore, it will be understood that there may be various equivalents and variations at the time of the application of this specification.

In order to clarify embodiments of the present invention, parts that are not connected to the description will be omitted, and the same elements or equivalents are referred to with the same reference numerals throughout the specification.

Also, the size and thickness of each element are arbitrarily shown in the drawings, but the embodiments of the present invention are not necessarily limited thereto, and in the drawings, the thickness of layers, films, panels, regions, etc. are exaggerated for clarity.

In addition, unless explicitly described to the contrary, the word "comprise" and variations such as "comprises" or "comprising" will be understood to imply the inclusion of stated elements but not the exclusion of any other elements.

Furthermore, each of terms, such as ". . . unit", ". . . means", ". . . part", and ". . . member" described in the specification mean a unit of a comprehensive element that performs at least one function or operation.

FIG. 1 illustrates a block diagram of a heat pump system for a vehicle according to an exemplary embodiment of the present invention.

A heat pump system for a vehicle according to an exemplary embodiment of the present invention selectively exchanges thermal energy generated from a refrigerant in condensation and evaporation with a coolant to perform a cooling mode or a heating mode of the vehicle by using only a low-temperature or high-temperature coolant.

The heat pump system for the vehicle may adjust a temperature of a battery module 24 by using one chiller 30 in which a refrigerant and a coolant are heat-exchanged, and uses waste heat of an electrical component 15 and the battery module 24, thereby improving heating efficiency.

The heat pump system is applicable to hybrid vehicles or electric vehicles.

Here, in the heat pump system for the electric vehicle, a cooling apparatus 10 for cooling the electrical component 15, a battery cooling apparatus 20 for cooling the battery module 24, a heating apparatus 40 for heating an interior by using a coolant, a centralized energy device 50 that exchanges a coolant and a refrigerant while circulating a refrigerant, and an air conditioner 70 cooling an interior by using a coolant may be mutually interconnected.

Referring to FIG. 1, the heat pump system includes the cooling apparatus 10, the battery cooling apparatus 20, the heating apparatus 40, the centralized energy device 50, and the air conditioner 70.

First, the cooling apparatus 10 includes a radiator 12 connected to a coolant line 11, a first water pump 14, a first valve V1, and a reservoir tank 16.

The first radiator 12 is disposed forward in a vehicle, and a cooling fan 13 is provided at a rear of the first radiator 12 to cool the coolant through heat-exchange with an ambient air, e.g., by the operation of the cooling fan 13.

In addition, the electrical component 15 may include an electric power control unit (EPCU), a motor, an inverter, or an on board charger (OBC).

The electrical component 15 configured as described above may be provided in the coolant line 11 to be cooled in a water-cooled manner.

Accordingly, when the waste heat of the electrical component 15 is recovered in the heating mode of the vehicle, the heat generated from the EPCU, the motor, the inverter, or the OBC may be recovered.

The cooling apparatus 10 may circulate the coolant in the coolant line 11 such that the coolant is supplied to the electrical component 15 provided in the coolant line 11.

The battery cooling apparatus 20 includes a battery coolant line 21 connected to the reservoir tank 16 through a second valve V2 and a second water pump 22 connected to the battery coolant line 21, and the battery module 24.

The battery cooling apparatus 20 may selectively circulate the coolant in the battery module 24 through an operation of the second water pump 22.

Meanwhile, the battery module 24 may be formed as a water-cooled type that supplies power to the electrical component 15, and is cooled by a coolant flowing along the battery coolant line 21.

Here, the first and second water pumps 14 and 22 may be electric water pumps.

In the present exemplary embodiment, the chiller 30 is provided in a first branch line 31 connected to the battery coolant line 21 through the second valve V2.

The chiller 30 is connected to a refrigerant line 51 of the centralized energy device 50 such that the refrigerant is passed through. That is, the chiller 30 may be a water-cooled heat exchanger into which a coolant flows.

Accordingly, the chiller 30 is selectively connected to the second branch line 35 connecting the coolant line 11 and the first branch line 31 through the first valve V1 and to the first branch line 31. The chiller 30 may regulate the temperature of the coolant by performing heat exchange between the coolant and the refrigerant that is selectively supplied from the centralized energy device 50.

Herein, a first end of the second branch line 35 may be connected to the coolant line 11 through the first valve V1. A second end of the second branch line 35 may be connected to the first branch line 31 between the second valve V2 and the chiller 30.

The second branch line 35 may be selectively opened and closed according to the operation of the first valve V1 and the first water pump 14. In addition, the second branch line 35 may connect the coolant line 11 and the first branch line 31 according to the operation of the first valve V1.

Meanwhile, in the heating mode of the vehicle, the first valve V1 may open the second branch line 35, and may close the coolant line 11 connected to the radiator 12 so that the coolant that has passed through the electrical component 15 is circulated without passing through the radiator 12.

In this state, when the electrical component 15 is overheated, the first valve V1 may open the coolant line 11 connected to the radiator 12 to allow some of the coolant passing through the electrical component 15 to flow into the second branch line 35 and the remaining coolant to flow into the radiator 12.

As a result, some coolant cooled in the radiator 12 may be supplied to the electrical component 15, thereby preventing the electrical component 15 from overheating.

Also, the heating apparatus 40 may include a first connection line 41 connected to the coolant line 11 through a third valve V3, and a third water pump 42 and a heater 62 provided in the first connection line 41 so as to heat an inside of the vehicle by using a coolant of a high temperature.

Herein, a coolant heater 43 to selectively heat the coolant circulating in the first connection line 41 may be provided in the first connection line 41 between the third water pump 42 and the heater 62.

The coolant heater 43 is ON-operated when the temperature of the coolant supplied to the heater 62 in the heating mode or the low temperature dehumidification mode of the vehicle is lower than a target temperature to heat the coolant circulated in the first connection line 41, thereby inflowing the coolant of which the temperature is increased to the heater 62.

In addition, the coolant heater 43 may be operated when the battery module 24 is heated.

The coolant heater 43 may be an electric heater that operates according to the power supply.

On the other hand, in the present exemplary embodiment, it is described that the coolant heater 43 is provided in the first connection line 41, however it is not limited thereto, and an air heater 45 to increase the temperature of the outside air inflowing to the interior of the vehicle may be applied instead of the coolant heater 43.

The air heater 45 may be disposed on the rear of the heater 62 toward the interior of the vehicle inside a heating, ventilation, and air conditioning (HVAC) module 60 to selectively heat the outside air passing through the heater 62.

That is, the heating apparatus 40 may be applied to one of the coolant heater 43 and the air heater 45.

The heating apparatus 40 constructed as described above supplies the high temperature coolant introduced from the cooling apparatus 10 to the first connection line 41 in the heating mode of the vehicle or the coolant of which the temperature is increased while circulating through the first connection line 41 to the heater 62 through the operation of the third water pump 42, thereby heating the vehicle interior.

In the present exemplary embodiment, the air conditioner 70 may include a second connection line 71 connected to the battery coolant line 21 through a fourth valve V4, and a fourth water pump 72 and a cooler 64 provided in the second connection line 71 so as to cool an inside of the vehicle by using a coolant of a low temperature.

The air conditioner 70 may supply the coolant whose temperature has decreased while circulating the second connection line 71 to the cooler 64, such that the interior of the vehicle can be cooled in the cooling mode of the vehicle.

Herein, the heater 62 and the cooler 64 may be provided inside the HVAC module 60.

In addition, the first, second, third and fourth water pumps 14, 22, 42, and 72 may be an electric water pump.

The first and second valves V1 and V2 may be 3-way valves capable of controlling a flow rate, and the third and fourth valves V3 and V4 may be 4-way valves.

Meanwhile, the HVAC module 60 includes an opening and closing door 66 which is provided between the heater 62 and the cooler 64 and controlled such that an outside air passing through the cooler 64 is selectively flowed into the heater 62 according to the cooling, heating, and dehumidification modes of the vehicle.

That is, the opening and closing door 66 is opened to allow the outside air passing through the cooler 64 to be introduced into the heater 62 in the heating mode of the vehicle. In contrast, in the cooling mode of the vehicle, the opening and closing door 66 closes off the heater 62 such that the outside air that is cooled while passing through the cooler 64 directly flows into the vehicle.

Herein, when the coolant heater 43 is not provided in the heating apparatus 40, the air heater 45 provided in the HVAC module 60 may be provided at an opposite side of the cooler 64 with the heater 62 interposed therebetween.

The air heater 45 may be operated to raise the temperature of the outside air passing through the heater 62 when the temperature of the coolant supplied to the heater 52a is lower than a target temperature for interior heating.

On the other hand, the air heater 45 may be provided inside the HVAC module 60 when the coolant heater 43 is not provided in the first connection line 41.

That is, in the heat pump system according to embodiments of the present invention, only one of the coolant heater 43 and the air heater 45 may be applied.

In the present exemplary embodiment, the centralized energy (CE) device 50 is connected to the first and second connection lines 41 and 71 to respectively supply a low-temperature coolant to the air conditioner 70 and a high-temperature coolant to the heating apparatus 40.

The CE device 50 performs selective heat exchange between thermal energy generated from condensation and evaporation of the refrigerant that circulates in the refrigerant line 51 with the coolant that is supplied through the first and second connection lines 41 and 71, respectively.

Here, the refrigerant may be a high-performing R152-a, R744, or R290 refrigerant.

That is, a high-temperature coolant is supplied to the heater 62 through the first connection line 41, and a low-temperature coolant is supplied to the cooler 64 through the second connection line 71.

Herein, the CE device 50 includes a condenser 53, an expansion valve 55, an evaporator 56, and a compressor 59.

First, the refrigerant is circulated inside the condenser 53, and the condenser 53 is provided between the third valve V3 and the heater 62.

The condenser 53 may condense the refrigerant through heat-exchange between the refrigerant and the coolant, and increase the temperature of the coolant.

Herein, the coolant circulating the heating apparatus 40 may be supplied to the condenser 53 along the first connection line 41 so that the condenser 53 condenses the refrigerant through heat-exchange with the coolant.

Accordingly, the condenser 53 may condense the refrigerant by heat-exchange from the coolant circulating in the first connection line 41 and the high-temperature refrigerant supplied from the compressor 59 in the heating mode of the vehicle, and may supply the high-temperature coolant to the heater 62 through the first connection line 41.

The expansion valve 55 may be connected to the condenser 53 through the refrigerant line 51. The expansion valve 55 is expanded by receiving the refrigerant having passed through the condenser 53. The expansion valve 55 may be formed of either a mechanic or electronic type.

The evaporator 56 is connected to the expansion valve 55 through the refrigerant line 51. The evaporator 56 is provided in the second connection line 71 between the fourth valve V4 and the cooler 64 so as to cool the coolant that circulates along the second connection line 71 in the air conditioner 70.

The evaporator 46 evaporates the refrigerant through heat-exchange with the coolant, and may lower the temperature of the coolant.

Herein, the coolant circulating the air conditioner 70 may be supplied to the evaporator 56 along the second connection line 71 so that the evaporator 56 evaporates the refrigerant through heat-exchange with the coolant.

Accordingly, the evaporator 56 cools the coolant circulating in the cooling mode of the vehicle through the second connection line 71 through heat-exchange with the low-temperature refrigerant evaporated therein, and may supply the low-temperature coolant to the cooler 64 through the second connection line 71.

In addition, the compressor 59 is provided in the refrigerant line 51 between the evaporator 46 and the condenser 53. The compressor 59 compresses the refrigerant of a gas state discharged from the evaporator 56, and may supply the compressed refrigerant to the condenser 53.

The accumulator 57 is provided in the refrigerant line 51 between the evaporator 56 and the compressor 59.

Such an accumulator 57 improves the efficiency and durability of the compressor 59 by supplying only the gaseous refrigerant to the compressor 59.

Herein, the chiller 30 may be provided in the refrigerant line 51 between the evaporator 56 and the accumulator 57.

In the present exemplary embodiment, the chiller 30, the condenser 53, and the evaporator 56 may be a water-cooled heat exchanger into which a coolant flows.

Meanwhile, the chiller 30 may lower the temperature of the coolant passing through the inside of the chiller 30 by using a low-temperature refrigerant supplied from the evaporator 56, when cooling the battery module 24 with the refrigerant.

As a result, the battery module 24 may be cooled more efficiently by inflowing the coolant having the lower temperature while passing through the chiller 30.

On the other hand, although not illustrated in the drawing, an internal heat exchanger (not shown) may be provided in the refrigerant line 51 between the evaporator 56 and the compressor 59.

The refrigerant line 51 that connects the condenser 53 and the expansion valve 55 and the refrigerant line 51 that connects the evaporator 56 and the compressor 59 may be respectively connected to the internal heat exchanger.

The internal heat exchanger additionally condenses the refrigerant condensed by the condenser 53 through heat-exchange with a low-temperature refrigerant discharged from the evaporator 56 and then the additionally condensed refrigerant is introduced to the expansion valve 55.

That is, the condensed refrigerant, discharged from the condenser 53, and the low-temperature refrigerant, discharged from the evaporator 56, are respectively introduced into the internal heat exchanger. Accordingly, the internal heat exchanger additionally exchanges heat between the low-temperature refrigerant and the condensed refrigerant to further decrease a temperature of the refrigerant and increase the amount of condensation.

As described, since the internal heat exchanger further condenses the refrigerant that has been condensed in the condenser 53, sub-cooling of the refrigerant can be increased, and accordingly, a coefficient of performance, which is a coefficient of cooling performance with respect to power consumption of the compressor, can be improved.

Hereinafter, an operation in each mode of the heat pump system for the vehicle according to an exemplary embodiment of the present invention configured as above will be described with reference to FIG. 2 to FIG. 10.

First, the operation of the heat pump system for the vehicle according to an exemplary embodiment of the present invention is described with reference to FIG. 2 when cooling the electrical component 15 and the battery module 24 by using the coolant.

Figure 2:
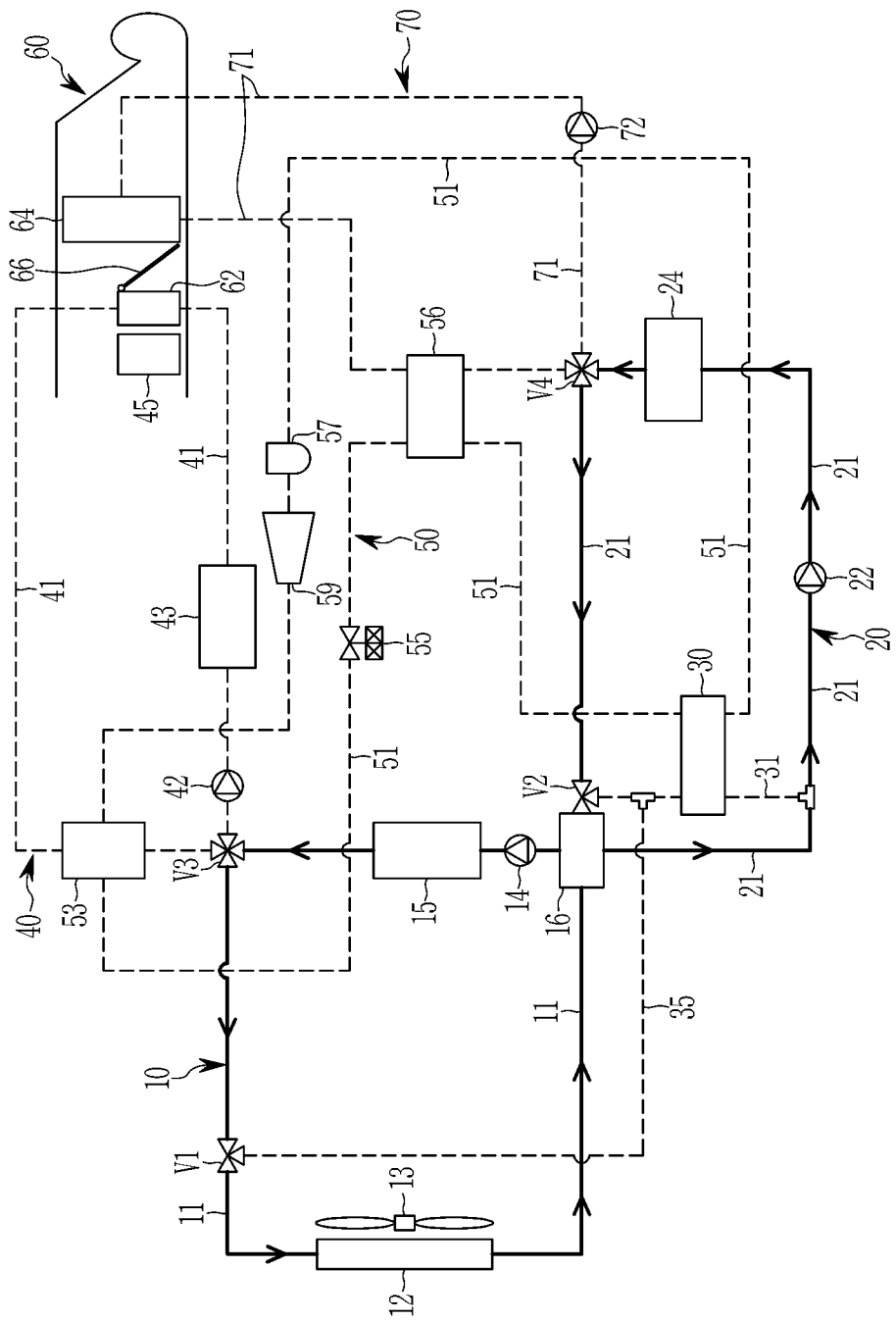
FIG. 2 illustrates an operational state diagram for cooling an electrical component and a battery module using a coolant in the heat pump system for a vehicle according to an exemplary embodiment of the present invention.

FIG. 2 illustrates an operational state diagram for cooling an electrical component and a battery module using a coolant in the heat pump system for a vehicle according to an exemplary embodiment of the present invention.

Referring to FIG. 2, the first and second branch lines 31 and 35 are closed through the operation of the first and second valves V1 and V2, respectively.

In addition, the battery coolant line 21 is connected to the reservoir tank 16 through the operation of the second valve V2.

In this state, the first water pump 14 is operated for cooling of the electrical component 15 in the cooling apparatus 10. Accordingly, the coolant cooled in the radiator 12 and stored in the reservoir tank 16 is supplied to the electrical component 15.

In the battery cooling apparatus 20, the second water pump 22 is operated to cool the battery module 24.

Then, the coolant stored in the reservoir tank 16 is supplied to the battery module 24, while circulating through the battery coolant line 21 connected to the reservoir tank 16 through the operation of the second valve V2.

That is, the coolant cooled in the radiator 12 and stored in the reservoir tank 16 circulates through the coolant line 11 and the battery coolant line 21 by the operations of the first and second water pumps 14 and 22, respectively, to efficiently cool the electrical component 15 and the battery module 24.

The CE device 50, the heating apparatus 40, and the air conditioner 70 are not operated because the cooling mode of the vehicle is not activated.

On the other hand, although it has been described in the present exemplary embodiment that both of the electrical component 15 and the battery module 24 are cooled, the present invention is not limited thereto, and when one of the electrical component 15 and the battery module 24 is separately cooled, the first and second water pumps 14 and 22 may be selectively operated.

An operation of the case of cooling the battery module 24 in the cooling mode of the vehicle will be described with reference to FIG. 3.

Figure 3:
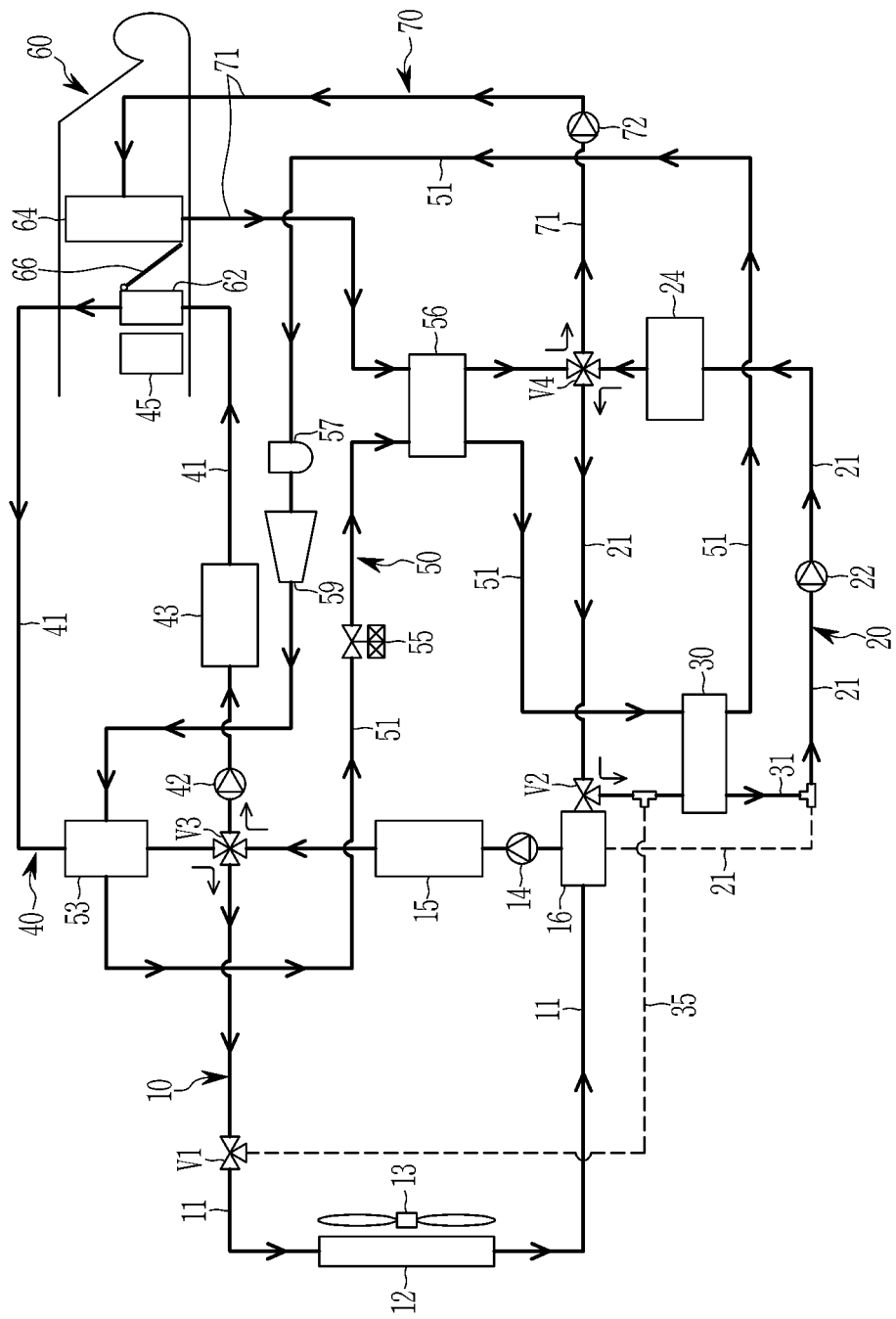
FIG. 3 illustrates an operational state diagram for cooling a battery module by using a refrigerant in a cooling mode of a vehicle in the heat pump system for a vehicle according to an exemplary embodiment of the present invention.

FIG. 3 illustrates an operational state diagram for cooling a battery module by using a refrigerant in a cooling mode of a vehicle in the heat pump system for a vehicle according to an exemplary embodiment of the present invention.

Referring to FIG. 3, in the cooling apparatus 10, the coolant is circulated in the coolant line 11 through the operation of the first water pump 14. Accordingly, the coolant cooled by the radiator 12 is circulated to the electrical component 15.

Herein, the second branch line 35 is closed by the operation of the first valve V1.

In the heating apparatus 40, the coolant line 11 and the first connection line 41 are connected by the operation of the third valve V3 such that the coolant supplied from the cooling apparatus 11 is circulated.

Thus, the coolant cooled by the radiator 12 may be supplied to the condenser 53 through the operation of the first and third water pumps 14 and 42.

In the battery cooling apparatus 20, the first branch line 31 is opened through the operation of the second valve V2. A portion of the battery coolant line 21 connected to the reservoir tank 16 is closed on the basis of the first branch line 31.

In this state, the coolant having passed through the chiller 30 may be supplied to the battery module 24 while it circulates along the first branch line 31 and the battery coolant line 21 connected to the first branch line 31 without passing through the reservoir tank 16 through the operation of the second water pump 22.

That is, in the battery cooling apparatus 20, a closed circuit through which the coolant independently circulates may be formed by connecting the opened first branch line 31 with the battery coolant line 21 in a state where the connection with the connection of the reservoir tank 16 is closed through the operation of the second valve V2.

In the air conditioner 70, the second connection line 71 may form an independent closed circuit that is independent of the battery coolant line 21 through the operation of the fourth valve V4.

Accordingly, in the air conditioner 70, the coolant is circulated along the second connection line 71 by the operation of the fourth water pump 72, and the low-temperature coolant passing through the evaporator 56 may be supplied to the cooler 64.

In the CE device 50, each constituent element operates to cool the interior of the vehicle. Accordingly, the refrigerant is circulated along the refrigerant line 51.

The heating apparatus 40 supplies the coolant, supplied from the cooling apparatus 10 by the operation of the third water pump 42, to the condenser 53.

Accordingly, the condenser 53 condenses the refrigerant supplied from the compressor 59 using the coolant circulating along the first connection line 41.

In addition, the evaporator 56 heat-exchanges the coolant circulating along the second connection line 71 with an internally evaporated refrigerant of the low temperature by operations of the fourth water pump 72.

The coolant of a low temperature having passed through the evaporator 56 is supplied to the cooler 64 along the second connection line 71 by the operation of the fourth water pump 72.

That is, the refrigerant circulating along the refrigerant line 51 in the CE device 50 is condensed by heat-exchanging with the coolant passing through the condenser 53.

Next, the refrigerant is expanded by the expansion valve 55, and is evaporated in the evaporator 46.

In this case, the refrigerant evaporated from the evaporator 56 cools the coolant introduced through the second connection line 71. Accordingly, the coolant passes through the evaporator 56 to be cooled at a low temperature, and the cooled coolant is supplied to the cooler 64 through the second connection line 71.

The refrigerant that has passed through the evaporator 56 sequentially passes through the chiller 30, the accumulator 57, the compressor 59, and the condenser 53 along the refrigerant line 51.

Herein, external air introduced into the HVAC module 60 is heat-exchanged with the coolant of a low temperature introduced into the cooler 64 to be cooled.

At this time, the opening and closing door 66 reduces a portion of the cooled outside air passing through the heater 62 so as to not pass through the heater 62. Accordingly, the cooled external air may be directly introduced into an inside of the vehicle to cool the inside of the vehicle.

The coolant passing through the chiller 30 is circulated in the battery coolant line 21 and the first branch line 31 without passing through the reservoir tank 16 to cool the battery module through the operation of the second water pump 22.

The coolant passing through the chiller 30 is cooled through heat-exchange with the refrigerant that is supplied from the evaporator 56 to the chiller 30. The coolant cooled in the chiller 30 is supplied to the battery module 24. Accordingly, the battery module 24 is cooled by the cooled coolant.

That is, the coolant with the increased temperature from cooling the battery module 24 is cooled through heat-exchange inside the chiller 30 with the low temperature low pressure refrigerant. The cooled coolant is again supplied to the battery module 24 through the battery coolant line 21 and the first branch line 31.

Accordingly, the coolant may efficiently cool the battery module 24 while repeating the above-described operation.

While repeating the above-described process, the coolant may cool the interior of the vehicle in the cooling mode, and the refrigerant may cool the coolant through heat-exchange while passing through the chiller 30.

The low-temperature coolant cooled in the chiller 30 is flowed into the battery module 24. Accordingly, the battery module 24 may be efficiently cooled by the supplied low temperature coolant.

In the present exemplary embodiment, an operation for cooling the battery module 24 during rapid charging of the battery module 24 in the cooling mode of the vehicle will be described with reference to FIG. 4.

Figure 4:
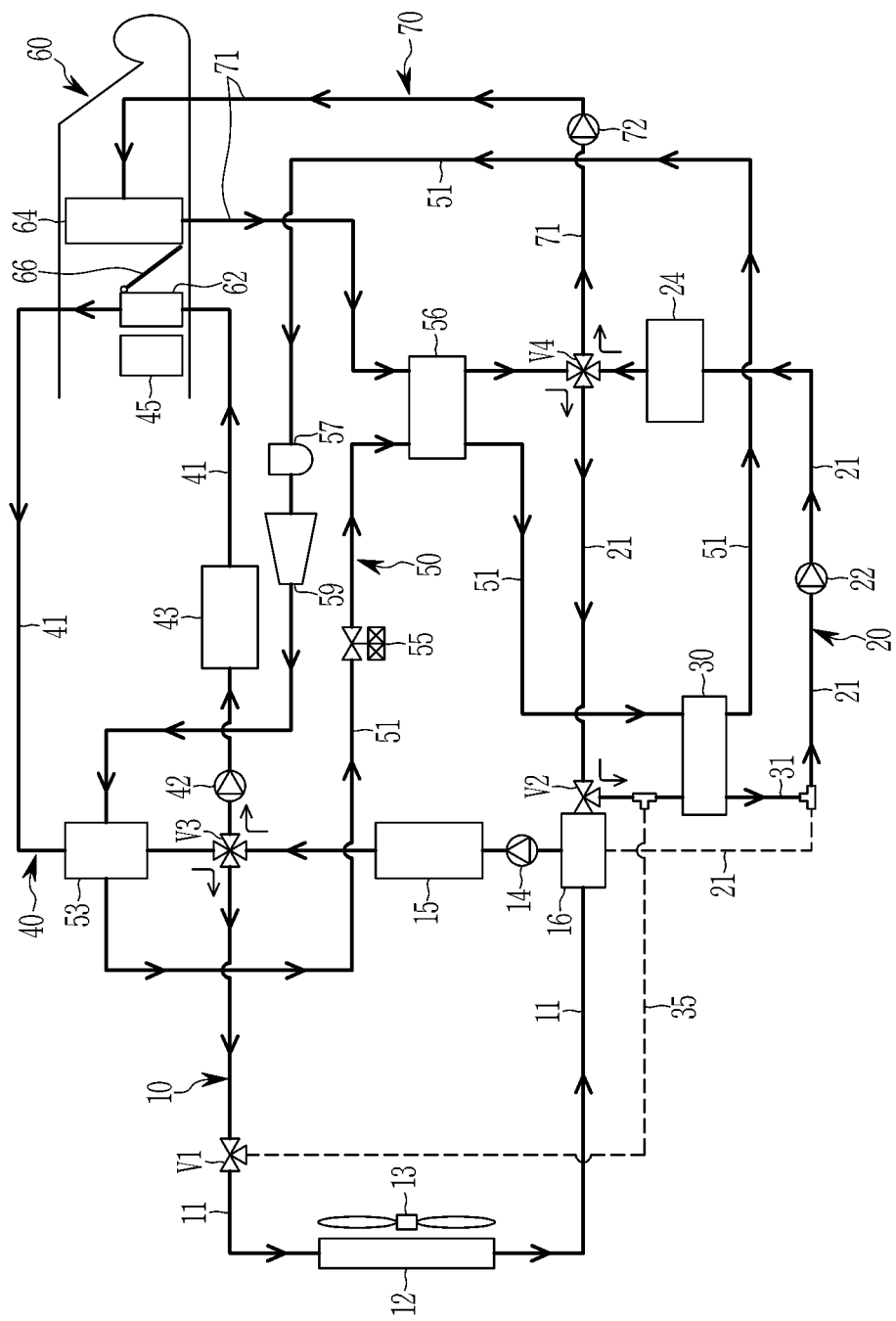
FIG. 4 illustrates an operational state diagram for cooling a battery module when rapidly charging the battery module in a cooling mode of a vehicle in the heat pump system for a vehicle according to an exemplary embodiment of the present invention.

FIG. 4 illustrates an operational state diagram for cooling a battery module when rapidly charging the battery module in a cooling mode of a vehicle in the heat pump system for a vehicle according to an exemplary embodiment of the present invention.

Referring to FIG. 4, in the cooling apparatus 10, the coolant is circulated in the coolant line 11 through the operation of the first water pump 14. Accordingly, the coolant cooled by the radiator 12 is circulated to the electrical component 15.

Herein, the second branch line 35 is closed by the operation of the first valve V1.

In the heating apparatus 40, the coolant line 11 and the first connection line 41 are connected by the operation of the third valve V3 such that the coolant supplied from the cooling apparatus 11 is circulated.

Thus, the coolant cooled by the radiator 12 may be supplied to the condenser 53 through the operation of the first and third water pumps 14 and 42.

In the battery cooling apparatus 20, the first branch line 31 is opened through the operation of the second valve V2. A portion of the battery coolant line 21 connected to the reservoir tank 16 is closed on the basis of the first branch line 31.

In this state, the coolant having passed through the chiller 30 may be supplied to the battery module 24 while it circulates along the first branch line 31 and the battery coolant line 21 connected to the first branch line 31 without passing through the reservoir tank 16 through the operation of the second water pump 22.

That is, in the battery cooling apparatus 20, a closed circuit through which the coolant independently circulates may be formed by connecting the opened first branch line 31 with the battery coolant line 21 in a state where the connection with the connection of the reservoir tank 16 is closed through the operation of the second valve V2.

In the air conditioner 70, the second connection line 71 is connected to the battery coolant line 21 through the operation of the fourth valve V4. Accordingly, in the air conditioner 70, the coolant is supplied from the battery cooling apparatus 20, and the coolant may be circulated along the second connection line 71 through the operation of the fourth water pump 72.

That is, in the air conditioner 70, the coolant is circulated from the battery cooling apparatus 20 along the second connection line 71, and the low-temperature coolant passing through the evaporator 56 may be supplied to the cooler 64.

In the CE device 50, each constituent element operates to cool the interior of the vehicle. Accordingly, the refrigerant is circulated along the refrigerant line 51.

The heating apparatus 40 supplies the coolant, supplied from the cooling apparatus 10 by the operation of the third water pump 42, to the condenser 53.

Accordingly, the condenser 53 condenses the refrigerant supplied from the compressor 59 using the coolant circulating along the first connection line 41.

In addition, the evaporator 56 heat-exchanges the coolant circulating along the second connection line 71 with an internally evaporated refrigerant of the low temperature by operations of the fourth water pump 72.

The coolant of a low temperature having passed through the evaporator 56 is supplied to the cooler 64 along the second connection line 71 by the operation of the fourth water pump 72.

That is, the refrigerant circulating along the refrigerant line 51 in the CE device 50 is condensed by heat-exchanging with the coolant passing through the condenser 53.

Next, the refrigerant is expanded by the expansion valve 55, and is evaporated in the evaporator 46.

In this case, the refrigerant evaporated from the evaporator 56 cools the coolant introduced through the second connection line 71.

Accordingly, the coolant passes through the evaporator 56 to be cooled at a low temperature, and the cooled coolant is supplied to the chiller 30 along the battery coolant line 21 and the first branch line 31 by the fourth valve V4.

The coolant passing through the chiller 30 is flowed along the battery coolant line 21 and the first branch line 31 through the operation of the second water pump 22 without passing through the reservoir tank 16 so as to cool the battery module 24.

Herein, the coolant supplied to the chiller 30 is additionally heat-exchanged with the refrigerant passing through the chiller 30, and its temperature may be lowered. The coolant whose temperature is lowered may be supplied to the battery module 24 along the battery coolant line 21, and may efficiently cool the battery module 24.

That is, when the battery module 24 is rapidly charged in the cooling mode of the vehicle, an amount of heat generated by the battery module 24 increases, thereby raising the temperature of the battery module 24.

Accordingly, the coolant whose temperature is lowered while sequentially passing through the evaporator 56 and the chiller 30 may cool the battery module 24 more efficiently while passing through the battery module 24.

Then, the coolant cooling the battery module 24 is supplied to the cooler 64 along the second connection line 71 connected through the operation of the fourth valve V4.

In this way, the coolant may efficiently cool the battery module 24 while repeatedly performing the above-described operation.

Meanwhile, the refrigerant that has passed through the evaporator 56 sequentially passes through the chiller 30, the accumulator 57, the compressor 59, and the condenser 53 along the refrigerant line 51.

Herein, external air introduced into the HVAC module 60 is heat-exchanged with the coolant of a low temperature introduced into the cooler 64 to be cooled.

At this time, the opening and closing door 66 reduces a portion of the cooled outside air passing through the heater 62 so as to not pass through the heater 62. Accordingly, the cooled external air may be directly introduced into an inside of the vehicle to cool the inside of the vehicle.

That is, while repeatedly performing the above-described process, the coolant cools the interior of the vehicle when the battery module 24 is rapidly charged in the cooling mode of the vehicle, and the refrigerant may cool the coolant passing through the evaporator 56 and the chiller 30.

The low-temperature coolant cooled while sequentially passing through the evaporator 56 and the chiller 30 flows into the battery module 24. Accordingly, the battery module 24 may be efficiently cooled by the supplied low temperature coolant.

In the present exemplary embodiment, the operation for the case of recovering the waste heat of the electrical component 15 in the heating mode of the vehicle will be described with reference to FIG. 5.

Figure 5:
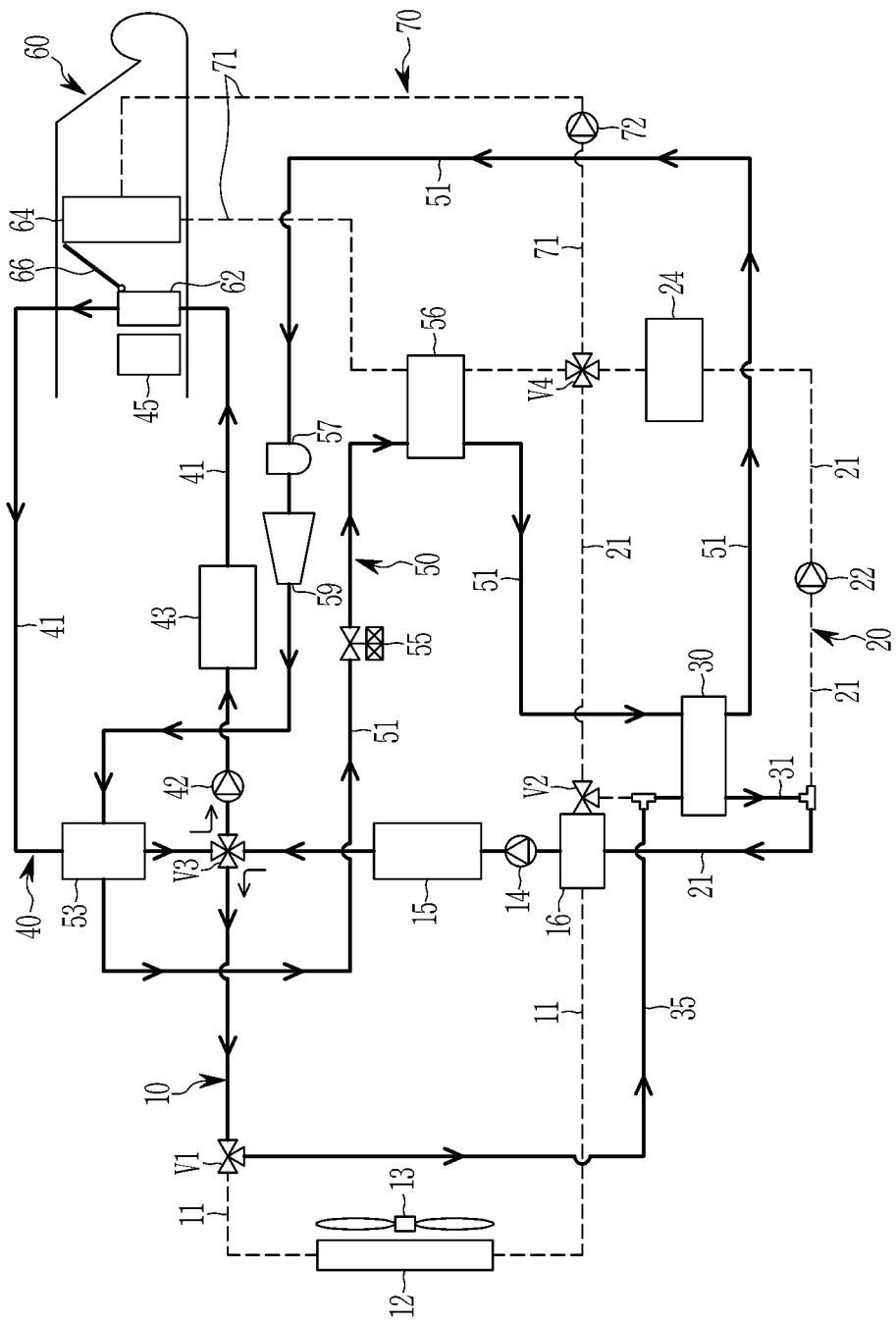
FIG. 5 illustrates an operational state diagram for waste heat recovery of an electrical component depending on a heating mode in a heat pump system for a vehicle according to an exemplary embodiment of the present invention.

FIG. 5 illustrates an operational state diagram for waste heat recovery of an electrical component depending on a heating mode in a heat pump system for a vehicle according to an exemplary embodiment of the present invention.

Referring to FIG. 5, in the cooling apparatus 10, the first water pump 14 is operated for circulation of the coolant.

Herein, the second branch line 35 is opened by the operation of the first valve V1. At the same time, on the basis of the second branch line 35, a portion of the coolant line 11 connected to the radiator 12 and a portion of the coolant line 11 connecting the radiator 12 and the reservoir tank 16 are closed through the operation of the first valve V1.

In the battery cooling apparatus 20, a portion of the first branch line 31 connected to the second branch line 35 is opened, and a remaining portion of the battery coolant line 21 except for the battery coolant line 21 connected to the reservoir tank 16 based on the first branch line 31 is closed through the operation of the second valve V2.

That is, the battery coolant line 21 connecting the second water pump 22 and the battery module 24 is closed, and the operation of the second water pump 22 is stopped. In addition, the air conditioner 70 is stopped.

In this state, the coolant passing through the electrical component 15 may be supplied to the chiller 30 along the opened branch line 35 and a portion of the first branch line 31 without passage through the radiator 12 through the operation of the first water pump 14.

The coolant discharged from the chiller 30 is flowed into the reservoir tank 16 through the first branch line 31 and the opened battery coolant line 21.

That is, in the cooling apparatus 10, the coolant line 11 is connected to the first branch line 31 through the opened second branch line 35.

Thus, the coolant passing through the electrical component 15 continuously circulates along the coolant line 11, the second branch line 35, the portion of the first branch line 31, and a portion of the opened battery coolant line 21 without passing through the radiator 12, and absorbs the waste heat from the electrical component 15 such that the temperature is increased.

The coolant with the increased temperature may be supplied to the chiller 30 provided at the first branch line 31. That is, the waste heat generated by the electrical component 15 raises the temperature of the coolant circulating through the coolant line 11, the second branch line 35, the portion of the first branch line 31, and the portion of the opened battery coolant line 21.

In the heating apparatus 40, the coolant circulates along the first connection line 41 through the operation of the third water pump 42.

The coolant line 11 and the first connection line 41 may form the independent closed circuit through the operation of the third valve V3.

Thus, the coolant circulating through the first connection line 41 may be supplied to the condenser 53 after passing through the heater 62 through the operation of the third water pump 42.

Herein, the coolant heater 43 is operated when the temperature of the coolant circulating along the first connection line 41 is lower than the target temperature, so that the coolant circulating in the first connection line 41 may be heated.

On the other hand, when the air heater 45 is applied instead of the coolant heater 43, the air heater 45 operates when the temperature of the outside air passing through the heater 62 is lower than the target temperature, and the outside air introduced to the interior of the vehicle may be heated.

In the present exemplary embodiment, in the CE device 50 each constituent element operates to heat the vehicle interior. Thus, the refrigerant circulates along the refrigerant line 51.

The heating apparatus 40 supplies the coolant supplied to the cooling apparatus 10 to the condenser 53 through the operation of the third water pump 42.

Accordingly, the condenser 53 condenses the refrigerant supplied from the compressor 59 by using the coolant circulated along the first connection line 41.

That is, in the CE device 50, the refrigerant circulated along the refrigerant line 51 is condensed through heat-exchange with the coolant passing through the condenser 53.

Then, the refrigerant discharged from the condenser 53 is expanded in the expansion valve 55, and evaporated in the evaporator 56.

The refrigerant passing through the evaporator 56 sequentially passes through the chiller 30, the accumulator 57, the compressor 59, and the condenser 53 along the refrigerant line 51.

The coolant, which absorbs the waste heat of the electrical component 15 and is increased in temperature, is recovered by increasing the temperature of the refrigerant supplied to the chiller 30 while passing through the chiller 30 through the operation of the first water pump 14.

That is, the chiller 30 evaporates the refrigerant supplied from the evaporator 56 through heat-exchange with the coolant of which the temperature is increased while passing through the electrical component 15, thereby recovering the waste heat of the electrical component 15.

Next, the refrigerant passing through the chiller 30 is supplied to the accumulator 57 along the refrigerant line 51.

The refrigerant supplied to the accumulator 57 is separated into gas and liquid. Of the refrigerant separated by gas and liquid, the gas refrigerant is supplied to the compressor 59.

The refrigerant compressed with the high temperature high pressure from the compressor 59 inflows to the condenser 53.

Here, the refrigerant supplied to the condenser 53 may increase the temperature of the coolant by exchanging heat with the coolant circulating through the first connection line 41. The coolant with raised temperature is supplied to the heater 62.

Meanwhile, the opening and closing door 66 is opened so that the outside air introduced to the HVAC module 60 and passing through the cooler 64 passes through the heater 62.

As a result, the outside air introduced from the outside flows into the interior in an uncooled temperature state when passing through the cooler 64, which is not supplied with the coolant. The introduced outside air is converted to a high temperature state while passing through the heater 62 to be introduced into the interior of the vehicle, thereby realizing the heating of the interior of the vehicle.

That is, the heat pump system according to the present exemplary embodiment is used to increase the temperature of the refrigerant by using the waste heat of the electrical component 15, when the heating of the vehicle is required, thereby reducing the power consumption of the compressor 59 and improving the heating efficiency.

In the present exemplary embodiment, the operation for the case of recovering the waste heat of the battery module 24 in the heating mode of the vehicle will be described with reference to FIG. 6.

Figure 6:
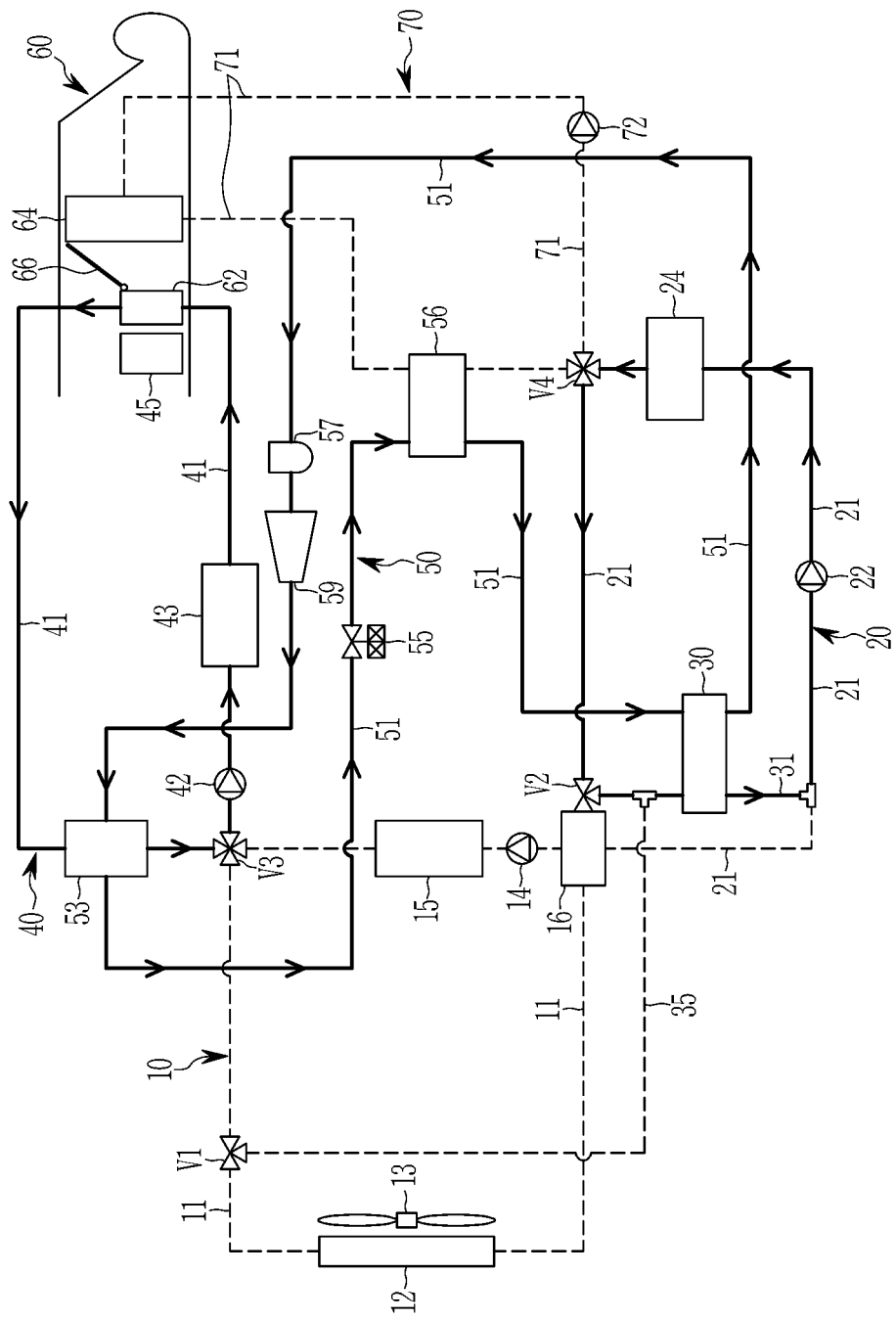
FIG. 6 illustrates an operational state diagram for waste heat recovery of a battery module depending on a heating mode in a heat pump system for a vehicle according to an exemplary embodiment of the present invention.

FIG. 6 illustrates an operational state diagram for waste heat recovery of a battery module depending on a heating mode in a heat pump system for a vehicle according to an exemplary embodiment of the present invention.

Referring to FIG. 6, the second branch line 35 is closed through the operation of the first valve V1, and the cooling apparatus 10 is stopped. In addition, the air conditioner 70 is stopped.

In the battery cooling apparatus 20, the reservoir tank 16 and the battery coolant line 21 are connected through the operation of the second valve V2, and the first branch line 31 is opened.

At this time, a portion of the battery coolant line 21 connecting the reservoir tank 16 and the chiller 30 based on the first branch line 31 is closed.

Accordingly, the coolant passing through the battery module 24 through the operation of the second water pump 22 may be supplied to the chiller 30 along the opened first branch line 31 and the battery coolant line 21.

The coolant discharged from the chiller 30 is flowed into the battery module 24 through the first branch line 31 and the opened battery coolant line 21.

Thus, the coolant passing through the battery module 24 continuously circulates along the battery coolant line 21 and the first branch line 35, and absorbs the waste heat from the battery module 24 such that the temperature is increased.

The coolant with the increased temperature may be supplied to the chiller 30 provided at the first branch line 31. That is, the waste heat generated by the battery module 24 raises the temperature of the coolant circulating through the battery coolant line 21 and the first branch line 31.

In the heating apparatus 40, the coolant circulates along the first connection line 41 through the operation of the third water pump 42.

The first connection line 41 may form the independent closed circuit through the operation of the third valve V3.

Thus, the coolant circulating through the first connection line 41 may be supplied to the condenser 53 after passing through the heater 62 through the operation of the third water pump 42.

Herein, the coolant heater 43 is operated when the temperature of the coolant circulating along the first connection line 41 is lower than the target temperature, so that the coolant circulating in the first connection line 41 may be heated.

On the other hand, when the air heater 45 is applied instead of the coolant heater 43, the air heater 45 operates when the temperature of the outside air passing through the heater 62 is lower than the target temperature, and the outside air introduced to the interior of the vehicle may be heated.

In the present exemplary embodiment, in the CE device 50 each constituent element operates to heat the vehicle interior. Thus, the refrigerant circulates along the refrigerant line 51.

The heating apparatus 40 supplies the coolant supplied to the cooling apparatus 10 to the condenser 53 through the operation of the third water pump 42.

Accordingly, the condenser 53 condenses the refrigerant supplied from the compressor 59 by using the coolant circulated along the first connection line 41.

That is, in the CE device 50, the refrigerant circulated along the refrigerant line 51 is condensed through heat-exchange with the coolant passing through the condenser 53.

Then, the refrigerant discharged from the condenser 53 is expanded in the expansion valve 55, and evaporated in the evaporator 56.

The refrigerant passing through the evaporator 56 sequentially passes through the chiller 30, the accumulator 57, the compressor 59, and the condenser 53 along the refrigerant line 51.

The coolant, which absorbs the waste heat of the battery module 24 and is increased in temperature, is recovered by increasing the temperature of the refrigerant supplied to the chiller 30 while passing through the chiller 30 through the operation of the second water pump 22.

That is, the chiller 30 evaporates the refrigerant supplied from the evaporator 56 through heat-exchange with the coolant of which the temperature is increased while passing through the battery module 24, thereby recovering the waste heat of the battery module 24.

Next, the refrigerant passing through the chiller 30 is supplied to the accumulator 57 along the refrigerant line 51.

The refrigerant supplied to the accumulator 57 is separated into gas and liquid. Of the refrigerant separated by gas and liquid, the gas refrigerant is supplied to the compressor 59.

The refrigerant compressed with the high temperature high pressure from the compressor 59 inflows to the condenser 53.

Here, the refrigerant supplied to the condenser 53 may increase the temperature of the coolant by exchanging heat with the coolant circulating through the first connection line 41. The coolant with raised temperature is supplied to the heater 62.

Meanwhile, the opening and closing door 66 is opened so that the outside air introduced to the HVAC module 60 and passing through the cooler 64 passes through the heater 62.

As a result, the outside air introduced from the outside flows into the interior in an uncooled temperature state when passing through the cooler 64, which is not supplied with the coolant. The introduced outside air is converted to a high temperature state while passing through the heater 62 to be introduced into the interior of the vehicle, thereby realizing the heating of the interior of the vehicle.

That is, the heat pump system according to the present exemplary embodiment is used to increase the temperature of the refrigerant by using the waste heat of the battery module 24, when the heating of the vehicle is required, thereby reducing the power consumption of the compressor 59 and improving the heating efficiency.

On the other hand, in the present exemplary embodiment, the waste heat of the electrical component 15 and the battery module 24 are respectively recovered as an embodiment, but the embodiment is not limited thereto, and the waste heat of the electrical component 15 and the battery module 24 may be recovered together.

In the heating mode of the vehicle, the operation for using the waste heat of the electrical component 15 without the operation of the CE device 50 will be described with reference to FIG. 7.

Figure 7:
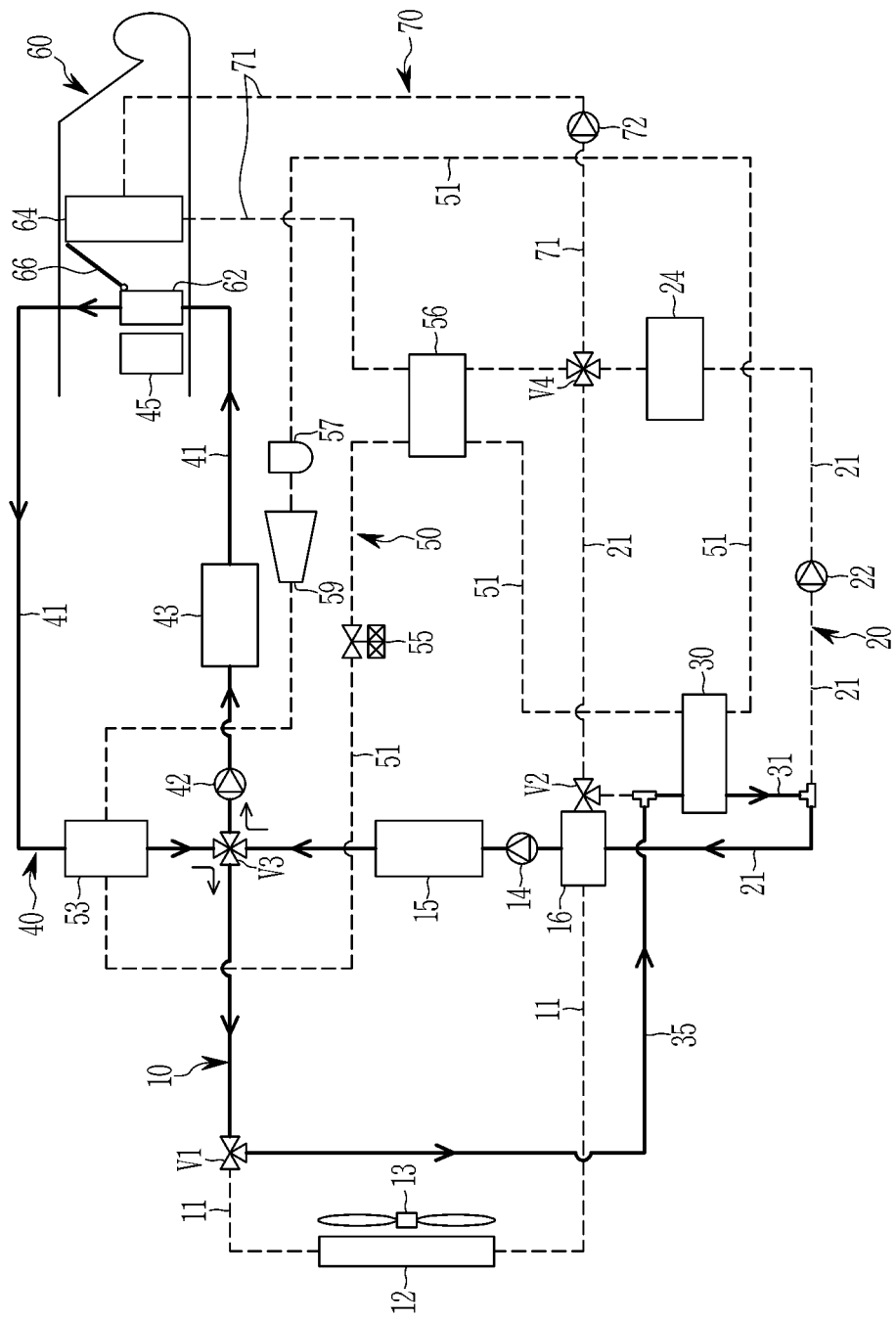
FIG. 7 illustrates an operational state diagram for performing the heating mode using waste heat of an electrical component in a heat pump system for a vehicle according to an exemplary embodiment of the present invention.

FIG. 7 illustrates an operational state diagram for performing the heating mode using waste heat of an electrical component in a heat pump system for a vehicle according to an exemplary embodiment of the present invention.

Referring to FIG. 7, in the cooling apparatus 10, the first water pump 14 is operated for circulation of the coolant. At this time, the CE device 50 and the air conditioner 70 are stopped.

Herein, the second branch line 35 is opened through the operation of the first valve V1. At the same time, on the basis of the second branch line 35, a portion of the coolant line 11 connected to the radiator 12 and a portion of the coolant line 11 connecting the radiator 12 and the reservoir tank 16 are closed through the operation of the first valve V1.

In the battery cooling apparatus 20, a portion of the first branch line 31 connected to the second branch line 35 is opened, and a remaining portion of the battery coolant line 21 except for the battery coolant line 21 connected to the reservoir tank 16 based on the first branch line 31 is closed through the operation of the second valve V2.

That is, the battery coolant line 21 connecting the second water pump 22 and the battery module 24 is closed, and the operation of the second water pump 22 is stopped.

In this state, the coolant whose temperature is increased while passing through the electrical component 15 through the operation of the first water pump 14 is supplied to the heater 62 along the first connection line 41 connected through the third valve V3 without passage through the radiator 12.

Herein, the coolant flowed into the first connection line 41 passes through the heater 62 by the operation of the third water pump 42. At this time, the coolant heater 43 is operated when the temperature of the coolant circulating along the first connection line 41 is lower than the target temperature, so that the coolant circulating in the first connection line 41 may be heated.

On the other hand, when the air heater 45 is applied instead of the coolant heater 43, the air heater 45 may be selectively operated according to the temperature of the outside air passing through the heater 62.

That is, the air heater 45 is operated when the temperature of the outside air passing through the heater 62 is lower than the target temperature, and the outside air flowed into the interior of the vehicle may be heated.

The air heater 45 is operated when the temperature of the outside air that has completed heat exchange with the high-temperature coolant while passing through the heater 62 is lower than a set temperature or a target heating temperature.

As a result, when the air heater 45 is operated, the outside air may be heated while passing through the air heater 45, to be introduced into the vehicle interior in a state where the temperature is raised.

In the present exemplary embodiment, the coolant discharged from the heater 62 is supplied to the chiller 30 along the first connection line 41, the third valve V3, the coolant line 11, the second branch line 35, and a portion of the first branch line 31 without passing through the radiator 12.

Herein, since the coolant supplied to the chiller 30 does not flow into the chiller 30, the coolant may pass through the chiller 30 without heat exchange with the refrigerant.

The coolant discharged from the chiller 30 passes through the first branch line 31 and the opened battery coolant line 21 sequentially, and introduces into the reservoir tank 16 again.

That is, the coolant that has passed through the electrical component 15 continues to circulate along the coolant line 11, the first connection line 41, the second branch line 35, the first branch line 31, and the portion of the battery coolant line 21 without passing through the radiator 12, and absorbs the waste heat from the electrical component 15, such that the temperature thereof increases.

The coolant having the temperature that has been raised is introduced into the first connection line 41 connected to the coolant line 11 through the operation of the third valve V3. Then, the high-temperature coolant introduced into the first connection line 41 is supplied to the heater 62.

Herein, the opening and closing door 66 is opened such that the outside air flowing into the HVAC module 60 passes through the heater 62.

Accordingly, the outside air introduced from the outside flows in a room temperature state in which it is not cooled when passing through the cooler 64 to which no refrigerant is supplied. The introduced outside air may be converted into a high temperature state while passing through the heater 62, and flows into the vehicle, thereby heating the interior of the vehicle.

In other words, according to embodiments of the present invention, it is possible to recover the waste heat generated in the electrical component 15 while repeating the above-described process, and use the waste heat for interior heating, thereby reducing power consumption and improving overall heating efficiency.

On the other hand, in the process of heating the interior of the vehicle by recovering the waste heat of the electrical component 15 using the coolant, when the electrical component 15 is overheated, a portion of the coolant line 11 connected to the radiator 12 and a portion of the coolant line 11 connecting the radiator 12 and the reservoir tank 16 are opened through the operation of the first valve V1.

Accordingly, the remaining coolant, which is not supplied to the heater 62 is cooled through the radiator 12.

The coolant that has been completely cooled may recover waste heat while passing through the electrical component 15, and at the same time, may efficiently cool the electrical component 15, together with the coolant introduced into the reservoir tank 16 through the second branch line 35, the first branch line 31, and the portion of the battery coolant line 21.

Specifically, when the electrical component 15 is overheated, the first valve V1 may open the coolant line 11 connected to the radiator 12 to allow some of the coolant passing through the electrical component 15 to flow into the second branch line 35 and the remaining coolant to flow into the radiator 12.

As a result, some coolant cooled in the radiator 12 may be supplied to the electrical component 15, thereby preventing the electrical component 15 from overheating.

Therefore, according to embodiments of the present invention, it is possible to recover the waste heat generated in the electrical component 15, and use the waste heat for interior heating, thereby reducing power consumption and improving overall heating efficiency.

At the same time, according to embodiments of the present invention, some coolant may be introduced into the radiator 12 through operation control of the first valve V1 capable of distributing the flow, to be cooled, and then be supplied to the electrical component 15, thereby efficiently cooling the electrical component 15 and ensuring the cooling performance of the electrical component 15.

The operation according to a low temperature dehumidification mode of the vehicle in the present exemplary embodiment will be described with reference to FIG. 8.

Figure 8:
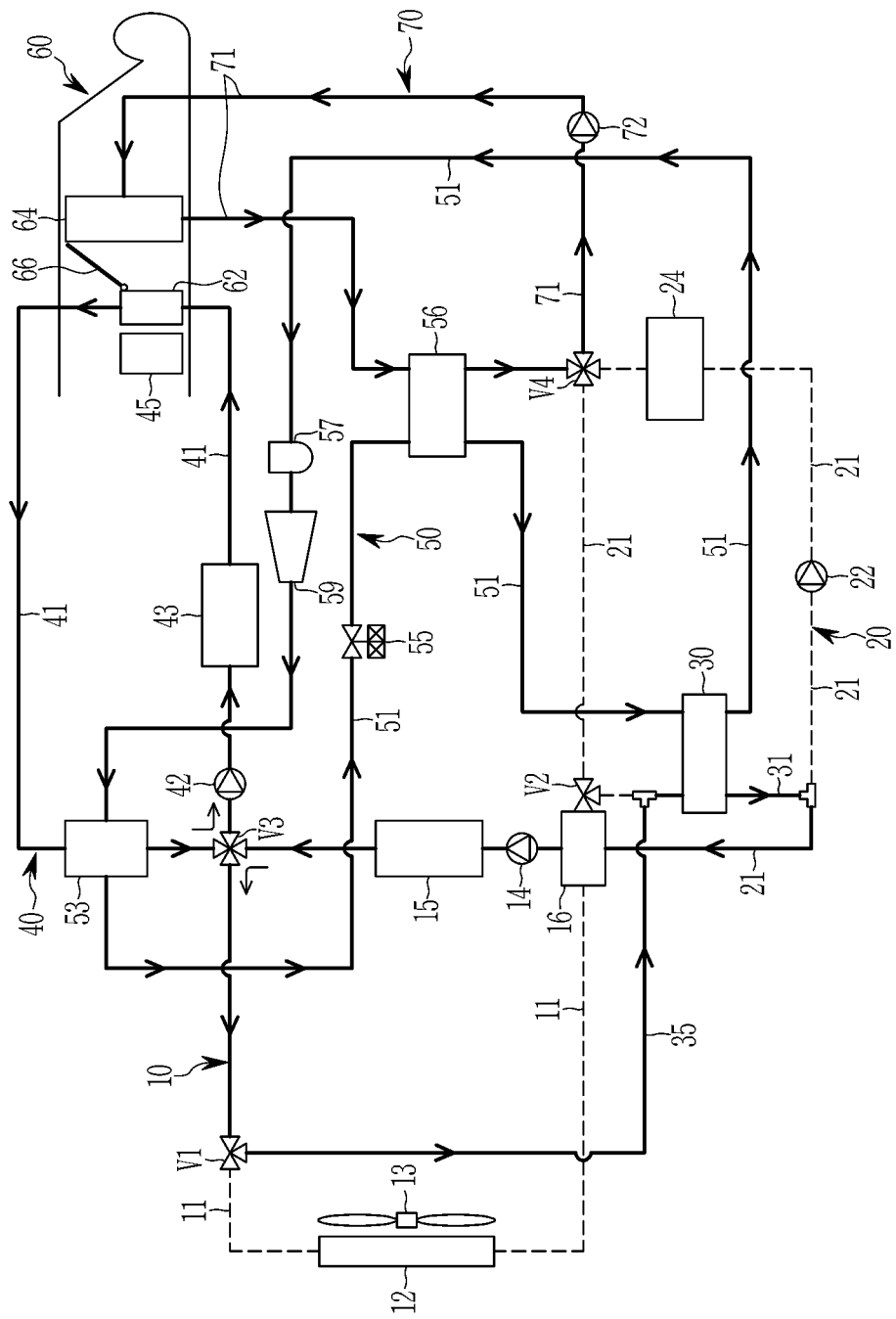
FIG. 8 illustrates an operational state diagram according to a low temperature dehumidification mode in a heat pump system for a vehicle according to another exemplary embodiment of the present invention.

FIG. 8 illustrates an operational state diagram according to a low temperature dehumidification mode in a heat pump system for a vehicle according to another exemplary embodiment of the present invention.

Here, the low temperature dehumidification mode is a mode that operates when dehumidification is required in the vehicle interior in the heating mode of the vehicle.

Referring to FIG. 8, when the waste heat of the electrical component 15 is sufficient, the heat pump system may recover the waste heat of the electrical component 15 and use it for the interior heating of the vehicle.

First, in the cooling apparatus 10, the first water pump 14 is operated for circulation of the coolant.

Herein, the second branch line 35 is opened through the operation of the first valve V1. At the same time, on the basis of the second branch line 35, a portion of the coolant line 11 connected to the radiator 12 and a portion of the coolant line 11 connecting the radiator 12 and the reservoir tank 16 are closed through the operation of the first valve V1.

In the battery cooling apparatus 20, a portion of the first branch line 31 connected to the second branch line 35 is opened, and a remaining portion of the battery coolant line 21 except for the battery coolant line 21 connected to the reservoir tank 16 based on the first branch line 31 is closed through the operation of the second valve V2.

Accordingly, the battery coolant line 21 connecting the second water pump 22 and the battery module 24 is closed, and the operation of the second water pump 22 is stopped. That is, the battery cooling apparatus 20 is stopped.

In this state, the coolant passing through the electrical component 15 may be supplied to the chiller 30 along the opened branch line 35 and a portion of the first branch line 31 without passage through the radiator 12 through the operation of the first water pump 14.

The coolant discharged from the chiller 30 is flowed into the reservoir tank 16 through the first branch line 31 and the opened battery coolant line 21.

That is, in the cooling apparatus 10, the coolant line 11 is connected to the first branch line 31 through the opened the second branch line 35.

Thus, the coolant passing through the electrical component 15 continuously circulates along the coolant line 11, the second branch line 35, the portion of the first branch line 31, and a portion of the opened battery coolant line 21 without passing through the radiator 12, and absorbs the waste heat from the electrical component 15 such that the temperature is increased.

The coolant with the increased temperature may be supplied to the chiller 30 provided at the first branch line 31. That is, the waste heat generated by the electrical component 15 raises the temperature of the coolant circulating through the coolant line 11, the second branch line 35, the portion of the first branch line 31, and the portion of the opened battery coolant line 21.

In the heating apparatus 40, the coolant circulates along the first connection line 41 through the operation of the third water pump 42.

The coolant line 11 and the first connection line 41 may form the independent closed circuit through the operation of the third valve V3.

Thus, the coolant circulating through the first connection line 41 may be supplied to the condenser 53 after passing through the heater 62 through the operation of the third water pump 42.

Herein, the coolant heater 43 is operated when the temperature of the coolant circulating along the first connection line 41 is lower than the target temperature, so that the coolant circulating in the first connection line 41 may be heated.

On the other hand, when the air heater 45 is applied instead of the coolant heater 43, the air heater 45 operates when the temperature of the outside air passing through the heater 62 is lower than the target temperature, and the outside air introduced to the interior of the vehicle may be heated.

In the present exemplary embodiment, in the CE device 50 each constituent element operates to heat the vehicle interior. Thus, the refrigerant circulates along the refrigerant line 51.

The heating apparatus 40 supplies the coolant supplied to the cooling apparatus 10 to the condenser 53 through the operation of the third water pump 42.

Accordingly, the condenser 53 condenses the refrigerant supplied from the compressor 59 by using the coolant circulated along the first connection line 41.

Meanwhile, in the air conditioner 70, the coolant is circulated along the second connection line 71 through the operation of the fourth water pump 72.

Thus, the evaporator 56 heat-exchanges the coolant circulating along the second connection line 71 with an internally evaporated refrigerant of a low temperature by operations of the fourth water pump 72.

The coolant of a low temperature having passed through the evaporator 56 is supplied to the cooler 64 along the second connection line 71 by the operation of the fourth water pump 72.

Accordingly, in the air conditioner 70, the coolant is circulated along the second connection line 71 by the operation of the fourth water pump 72, and the low-temperature coolant passing through the evaporator 56 may be supplied to the cooler 64.

That is, the refrigerant circulating along the refrigerant line 51 in the CE device 50 is condensed by heat-exchanging with the coolant passing through the condenser 53.

Next, the refrigerant is expanded by the expansion valve 55, and is evaporated in the evaporator 46.

In this case, the refrigerant evaporated from the evaporator 56 cools the coolant introduced through the second connection line 71. Accordingly, the coolant passes through the evaporator 56 to be cooled at a low temperature, and the cooled coolant is supplied to the cooler 64 through the second connection line 71.

Meanwhile, the refrigerant that has passed through the evaporator 56 sequentially passes through the chiller 30, the accumulator 57, the compressor 59, and the condenser 53 along the refrigerant line 51.

The coolant, which absorbs the waste heat of the electrical component 15 and is increased in temperature, is recovered by increasing the temperature of the refrigerant supplied to the chiller 30 while passing through the chiller 30 through the operation of the first water pump 14.

That is, the chiller 30 evaporates the refrigerant supplied from the evaporator 56 through heat-exchange with the coolant of which the temperature is increased while passing through the electrical component 15, thereby recovering the waste heat of the electrical component 15.

Next, the refrigerant passing through the chiller 30 is supplied to the accumulator 57 along the refrigerant line 51.

The refrigerant supplied to the accumulator 57 is separated into gas and liquid. Of the refrigerant separated by gas and liquid, the gas refrigerant is supplied to the compressor 59.

The refrigerant compressed with the high temperature high pressure from the compressor 59 inflows to the condenser 53.

Here, the refrigerant supplied to the condenser 53 may increase the temperature of the coolant by exchanging heat with the coolant circulating through the first connection line 41. The coolant with raised temperature is supplied to the heater 62.

Meanwhile, the opening and closing door 66 is opened so that the outside air introduced to the HVAC module 60 and passing through the cooler 64 passes through the heater 62.

That is, the outside air introduced to the HVAC module 60 is dehumidified while passing through the cooler 64 to which the low-temperature coolant is supplied.

The outdoor air dehumidified while passing through the cooler 64 is converted to a high temperature state while passing through the heater 62 and inflows into the vehicle interior, thereby heating and dehumidifying the interior of the vehicle.

That is, in the low temperature dehumidification mode, the heat pump system according to the exemplary embodiment absorbs the waste heat of the electrical component 15 and uses the absorbed waste heat for raising the temperature of the refrigerant to reduce the power consumption of the compressor 59 and enhance the heating efficiency.

In addition, the heat pump system may perform the interior dehumidification together by operating the air conditioner 70 to selectively supply the low-temperature coolant to the cooler 64.

In the present exemplary embodiment, the operation according to a high temperature dehumidification mode of the vehicle will be described with reference to FIG. 9.

Figure 9:
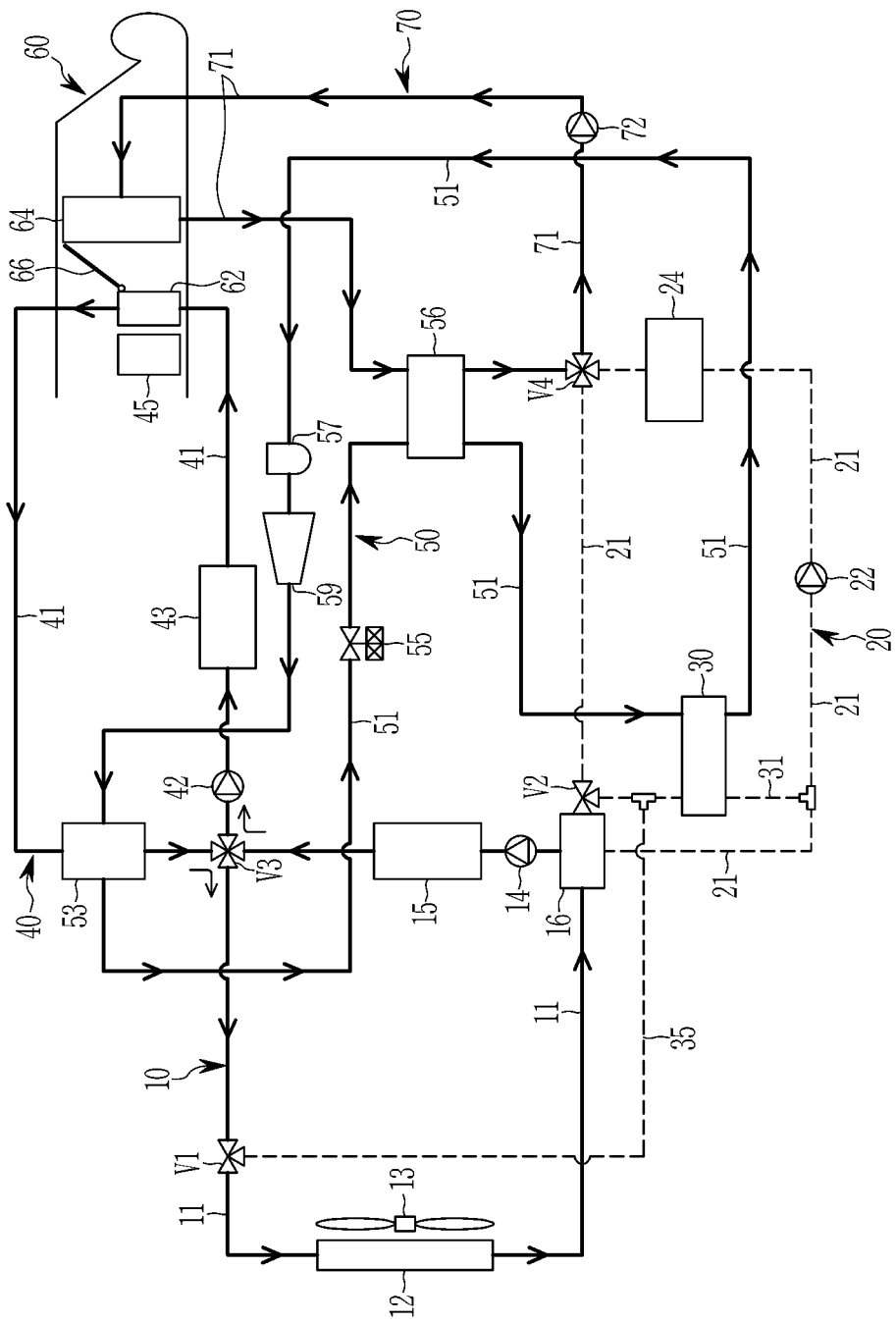
FIG. 9 illustrates an operational state diagram according to a high temperature dehumidification mode in a heat pump system for a vehicle according to another exemplary embodiment of the present invention.

FIG. 9 illustrates an operational state diagram according to a high temperature dehumidification mode in a heat pump system for a vehicle according to another exemplary embodiment of the present invention.

Here, the high temperature dehumidification mode is a mode in which the dehumidification is performed in the vehicle interior in the cooling mode of the vehicle.

Referring to FIG. 9, in the cooling apparatus 10, the first water pump 14 is operated for circulation of the coolant. Accordingly, the coolant cooled by the radiator 12 is circulated to the electrical component 15.

Herein, the second branch line 35 is closed by the operation of the first valve V1.

In the battery cooling apparatus 20, the battery coolant line 21 and the first branch line 31 are closed through the operation of the second valve V2. Accordingly, the battery cooling apparatus 20 is stopped.

In the heating apparatus 40, the coolant line 11 and the first connection line 41 are connected by the operation of the third valve V3 such that the coolant supplied from the cooling apparatus 11 is circulated.

Thus, the coolant cooled by the radiator 12 may be supplied to the condenser 53 through the operation of the first and third water pumps 14 and 42.

In the air conditioner 70, the second connection line 71 may form an independent closed circuit that is independent of the battery coolant line 21 through the operation of the fourth valve V4.

Accordingly, in the air conditioner 70, the coolant is circulated along the second connection line 71 by the operation of the fourth water pump 72, and the low-temperature coolant passing through the evaporator 56 may be supplied to the cooler 64.

In the CE device 50, each constituent element operates to cool the interior of the vehicle. Accordingly, the refrigerant is circulated along the refrigerant line 51.

The heating apparatus 40 supplies the coolant, supplied from the cooling apparatus 10 by the operation of the third water pump 42, to the condenser 53.

Accordingly, the condenser 53 condenses the refrigerant supplied from the compressor 59 using the coolant circulating along the first connection line 41.

In addition, the evaporator 56 heat-exchanges the coolant circulating along the second connection line 71 with an internally evaporated refrigerant of a low temperature by operations of the fourth water pump 72.

The coolant of a low temperature having passed through the evaporator 56 is supplied to the cooler 64 along the second connection line 71 by the operation of the fourth water pump 72.

Accordingly, in the air conditioner 70, the coolant is circulated along the second connection line 71 by the operation of the fourth water pump 72, and the low-temperature coolant passing through the evaporator 56 may be supplied to the cooler 64.

That is, the refrigerant circulating along the refrigerant line 51 in the CE device 50 is condensed by heat-exchange with the coolant passing through the condenser 53.

Next, the refrigerant is expanded by the expansion valve 55, and is evaporated in the evaporator 46.

In this case, the refrigerant evaporated from the evaporator 56 cools the coolant introduced through the second connection line 71. Accordingly, the coolant passes through the evaporator 56 to be cooled at a low temperature, and the cooled coolant is supplied to the cooler 64 through the second connection line 71.

Meanwhile, the refrigerant that has passed through the evaporator 56 sequentially passes through the chiller 30, the accumulator 57, the compressor 59, and the condenser 53 along the refrigerant line 51.

The refrigerant supplied to the accumulator 57 is separated into gas and liquid. Of the refrigerant separated by gas and liquid, the gas refrigerant is supplied to the compressor 59.

The refrigerant compressed with the high temperature high pressure from the compressor 59 inflows to the condenser 53.

Accordingly, the refrigerant supplied to the condenser 53 may increase the temperature of the coolant by exchanging heat with the coolant circulating through the first connection line 41. The coolant with raised temperature is supplied to the heater 62.

Herein, external air introduced into the HVAC module 60 is heat-exchanged with the coolant of a low temperature introduced into the cooler 64 to be cooled.

At this time, the opening and closing door 66 reduces a portion of the cooled outside air passing through the heater 62 so as to pass through the heater 62. Accordingly, the cooled outside air may be dehumidified while passing through the heater 62 and then flow into the interior of the vehicle.

That is, the high temperature dehumidification mode of the vehicle cools the interior of the vehicle by using the coolant while repeatedly performing the above-described processes, and simultaneously supplies the coolant having the increased temperature through heat-exchange with the refrigerant in the condenser 53 to the heater 62, thereby performing the interior dehumidification together therewith.

An operation of the case of heating the battery module 24 will be described with respect to FIG. 10.

Figure 10:
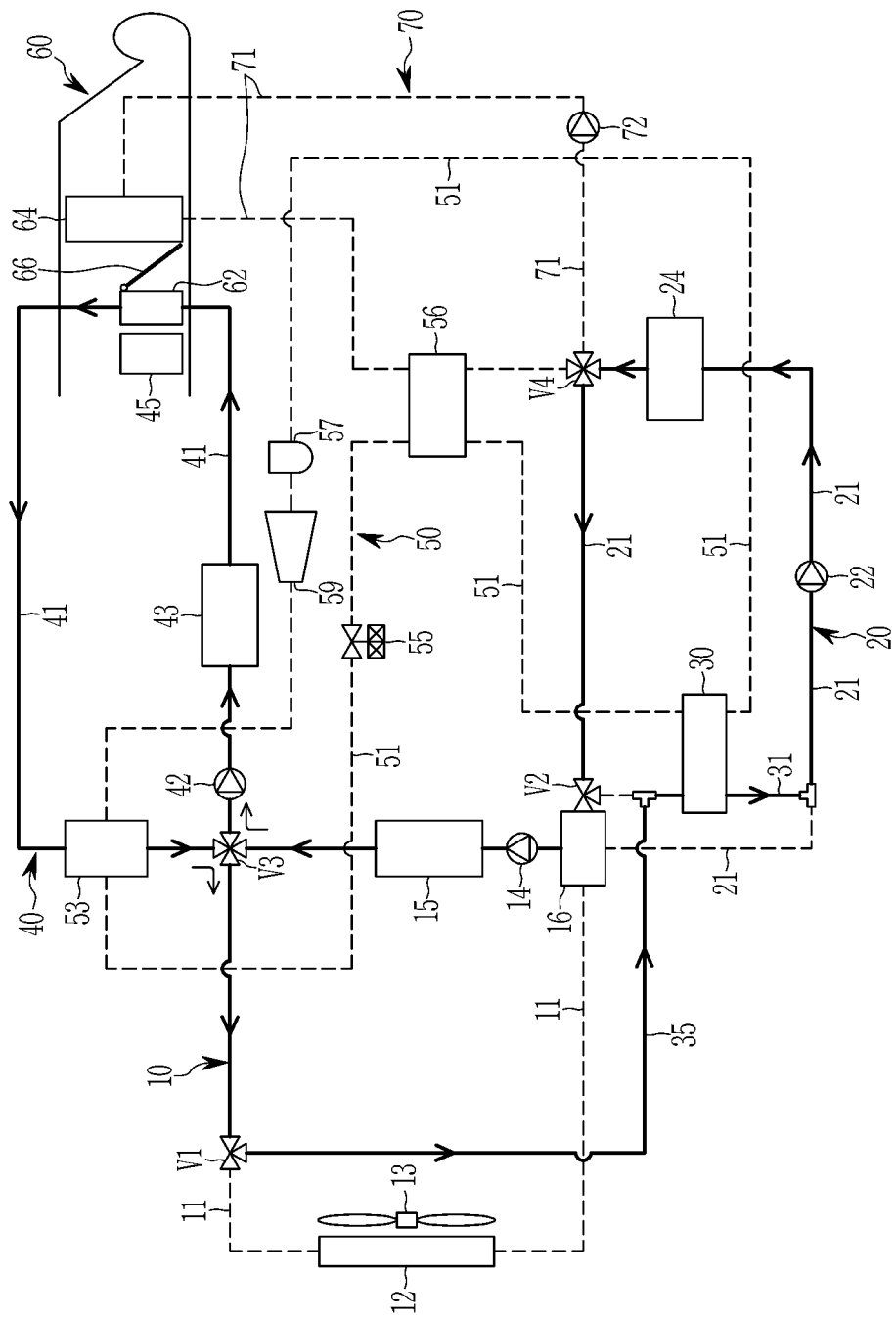
FIG. 10 illustrates an operational state diagram for heating of a battery module in a heat pump system for a vehicle according to an exemplary embodiment of the present invention.

FIG. 10 illustrates an operational state diagram for heating of a battery module in a heat pump system for a vehicle according to an exemplary embodiment of the present invention.

Referring to FIG. 10, the heat pump system may heat the battery module 24 by recovering the waste heat of the electrical component 15.

In the cooling apparatus 10, the second branch line 35 is opened through the operation of the first valve V1.

At the same time, on the basis of the second branch line 35, a portion of the coolant line 11 connected to the radiator 12 and a portion of the coolant line 11 connecting the radiator 12 and the reservoir tank 16 are closed through the operation of the first valve V1. Herein, the CE device 50 is stopped.

Accordingly, in the cooling apparatus 10, the coolant that has passed through the electrical component 15 may circulate along the opened second branch line 35 and the coolant line 11 without passing the radiator 12 through the operation of the first water pump 14.

In the battery cooling apparatus 20, a portion of the first branch line 31 connected to the second branch line 35 is opened, and a remaining portion of the battery coolant line 21 except for the battery coolant line 21 connected to the reservoir tank 16 based on the first branch line 31 is opened through the operation of the second valve V2.

As a result, the battery coolant line 21 connected to the reservoir tank 16 through the first branch line 31 may be closed, and the remaining battery coolant line 21 connected to the battery module 24 may be opened.

That is, in the battery cooling apparatus 20, the battery coolant line 21 which connects to the second water pump 22 and the battery module 24 is opened so as to be connected to the first branch line 31.

Accordingly, in the battery cooling apparatus 20, the coolant is circulated along the opened battery coolant line 21 and the first branch line 31 through the operation of the second water pump 22.

The coolant passing through the battery module 24 may be flowed into the reservoir tank 16 connected through the second valve V2.

Meanwhile, in the heating apparatus 40, the coolant line 11 and the first connection line 41 are connected by the operation of the third valve V3.

In this state, the coolant whose temperature is increased while passing through the electrical component 15 through the operation of the first water pump 14 is flowed into the first connection line 41 connected through the third valve V3 without passing through the radiator 12.

That is, in the cooling apparatus 10, the coolant with the increased temperature by the waste heat of the electrical component 15 may circulate through the first connection line 41 through the operation of the third water pump V3.

Herein, the coolant heater 43 is operated to heat the coolant when the temperature of the coolant circulating along the first connection line 41 is lower than the target temperature. Then, the coolant circulating in the first connection line 41 rises in temperature as it passes through the coolant heater 43.

Accordingly, the coolant having an increased temperature while passing through the coolant heater 43 is flowed into the coolant line 11 from the first connection line 41 through the third valve V3. Then, the high-temperature coolant is introduced into the first branch line 31 from the coolant line 11 through the second branch line 35.

The high-temperature coolant introduced into the first branch line 31 may be supplied to the battery module 24 connected through the battery coolant line 21 and the first branch line 31.

As a result, the high-temperature coolant may raise the temperature of the battery module 24.

As a result, according to embodiments of the present invention, it is possible to rapidly increase the temperature of the battery module 24 while repeating the above-described process, thereby efficiently managing the temperature of the battery module 24.

On the other hand, in the present exemplary embodiment, the chiller 30 is described as an embodiment provided in the refrigerant line 51 between the evaporator 56 and the compressor 59, but is not limited thereto.

That is, the heat pump system for the vehicle according to another exemplary embodiment of the present invention is described with reference to FIG. 11.

Figure 11:
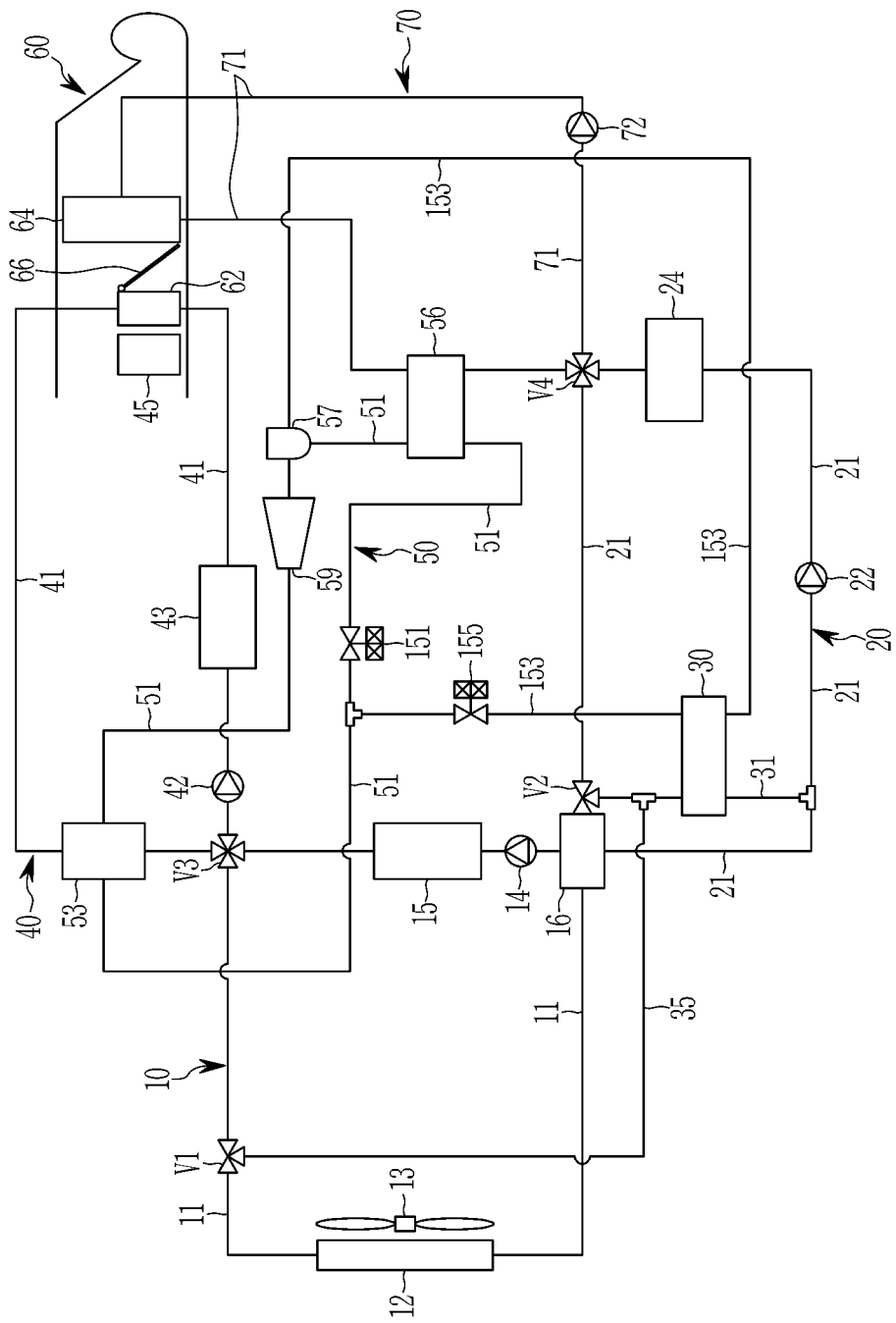
FIG. 11 illustrates a block diagram of a heat pump system for a vehicle according to another exemplary embodiment of the present invention.

FIG. 11 illustrates a block diagram of a heat pump system for a vehicle according to another exemplary embodiment of the present invention.

In the heat pump system for the vehicle according to another exemplary embodiment of the present invention, the cooling apparatus 10, the battery cooling apparatus 20, the chiller 30, the heat apparatus 40, and the air conditioner 70 except the centralized energy device 50 are the same as one embodiment of the present invention. Accordingly, repeated descriptions are omitted.

Referring to FIG. 11, in the heat pump system according to another exemplary embodiment of the present invention, the centralized energy device 50 includes a condenser 53, a first expansion valve 151, an evaporator 56, and a compressor 59.

First, the refrigerant is circulated inside the condenser 53, and the condenser 53 is provided between the third valve V3 and the heater 62.

The first expansion valve 151 may be connected to the condenser 53 through the refrigerant line 51. The first expansion valve 151 is expanded by receiving the refrigerant having passed through the condenser 53. The first expansion valve 151 may be formed of either a mechanic or electronic type.

The evaporator 56 is connected to the first expansion valve 151 through the refrigerant line 51. The evaporator 56 is provided in the second connection line 71 between the fourth valve V4 and the cooler 64 so as to cool the coolant that circulates along the second connection line 71 in the air conditioner 70.

The compressor 59 is provided in the refrigerant line 51 between the evaporator 46 and the condenser 53. The compressor 59 compresses the refrigerant of a gas state discharged from the evaporator 56, and may supply the compressed refrigerant to the condenser 53.

An accumulator 57 is provided in the refrigerant line 51 between the evaporator 56 and the compressor 59.

The accumulator 57 improves the efficiency and durability of the compressor 59 by supplying only the gaseous refrigerant to the compressor 59.

Herein, the chiller 30 may be provided on a refrigerant connection line 153. A first end of the refrigerant connection line 153 is connected to the refrigerant line 51 between the condenser 53 and the first expansion valve 151, and a second line of the refrigerant connection line 153 is connected to the accumulator 57.

Accordingly, the chiller 30 is connected in parallel with the refrigerant line 51 through the refrigerant connection line 153.

In addition, the refrigerant connection line 153 may be provided with a second expansion valve 155 for expanding while selectively controlling the inflow of the refrigerant to the chiller 30.

The second expansion valve 155 may expand the refrigerant flowing through the refrigerant connection line 153 to supply into the chiller 30, when cooling the battery module 24 using a refrigerant.

Herein, the second expansion valve 155 may be operated even when the waste heat of the electrical component 15 or the battery module 24 is recovered in the heating mode of the vehicle.

The second expansion valve 155 may selectively expand the refrigerant flowing through the refrigerant connection line 153 to supply into the chiller 30.

That is, the second expansion valve 155 expands the refrigerant discharged from the condenser 53 and flowing into the chiller 30 while lowering the temperature of the refrigerant, thereby the temperature of the coolant may be further lowered.

As described above, the heat pump system for the vehicle according to an exemplary embodiment of the present invention is applied, a system may be simplified and a layout of connection pipes in which a coolant circulates may be simplified by selectively heat-exchanging heat energy generated from a refrigerant with a coolant upon condensation and evaporation of the refrigerant to control an internal temperature of the vehicle using the heat-exchanged coolant of a low temperature or a high temperature.

According to embodiments of the present invention, the temperature of the battery module 24 may be adjusted depending on the mode of the vehicle by using one chiller 30 for performing heat exchange between the coolant and the refrigerant, and the interior of the vehicle may be cooled and heated by using the coolant, thereby simplifying the entire system.

Further, embodiments of the present invention may use the coolant heater 43 applied to the heating apparatus 40 to warm up the battery module 24 or to assist in an interior heating of the vehicle, thereby reducing the cost and weight.

Further, embodiments of the present invention may improve heating efficiency of the vehicle using waste heat of the electrical component 15 and the battery module 24, and may increase the whole travel distance of the vehicle through efficient temperature control of the battery module 24 in order to obtain optimal performance of the battery module.

Moreover, embodiments of the present invention may reduce a size and a weight by packaging the centralized energy device 50 for generating heat energy through condensation and evaporation of a coolant, and may prevent noise, vibration, and operational instability from being generated as compared with an air conditioner according to the related art by using a high performance refrigerant.

In addition, through the simplification of the entire system, a reduction in production cost and weight is possible, and space utilization may be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A heat pump system for a vehicle, the system comprising:
   a cooling apparatus including a radiator, a first water pump, a first valve, and a reservoir tank which are connected through a coolant line, the cooling apparatus configured to circulate a coolant in the coolant line to cool at least one electrical component provided in the coolant line;
   a battery cooling apparatus including a battery coolant line connected to the reservoir tank through a second valve, and a second water pump and a battery module which are connected through the battery coolant line, the battery cooling apparatus configured to circulate the coolant in the battery module;
   a chiller provided in a first branch line that is connected to the battery coolant line through the second valve, the chiller configured to pass through a refrigerant to adjust a temperature of the coolant by performing heat-exchange between the coolant that is selectively introduced into a second branch line connecting the coolant line and the first branch line through the first valve, and the first branch line and the refrigerant;
   a heating apparatus including a first connection line connected to the coolant line through a second valve, and a third water pump and a heater provided in the first connection line and configured to heat an interior of the vehicle using the coolant;
   an air conditioner including a second connection line connected to the battery coolant line through a fourth valve, and a fourth water pump and a cooler provided in the second connection line and configured to cool the interior of the vehicle using the coolant; and
   a centralized energy device connected to the first and second connection lines and configured to supply the coolant when of a low temperature to the an air conditioner, and to supply the coolant when of a high temperature to the heating apparatus, and to selectively heat-exchange heat energy generated upon condensing and evaporation of a refrigerant circulating inside with the coolant.

2. The system of claim 1, wherein:
   a first end of the second branch line is connected to the coolant line through the first valve, and a second end of the second branch line is connected to the first branch line between the second valve and the chiller; and
   the heater and the cooler are provided inside an HVAC module.

3. The system of claim 2, wherein the battery module is configured to be heated, and wherein when the battery module is heated:
   the first valve is configured to be operated to open the second branch line;
   in the cooling apparatus, on the basis of the second branch line, the coolant line connected to the radiator is closed and the first water pump is configured to be operated to circulate the coolant that has passed through the electrical component along the opened second branch line and the coolant line without passing the radiator;
   a portion of the first branch line is connected to the second branch line;
   the battery coolant line connected to the reservoir tank is closed based on the first branch line;
   in the battery cooling apparatus, the second water pump is configured to be operated to circulate the coolant along the battery coolant line and a portion of the first branch line in a state in which the second valve is configured to be operated to connect the reservoir tank and the battery coolant line;
   in the heating apparatus, a third valve is configured to be operated to connect the coolant line and the first connection line, and in the cooling apparatus, the third water pump is configured to be operated to circulate the coolant with an increased temperature by waste heat of the electrical component to the first connection line; and
   a high-temperature coolant is configured to flow into the coolant line from the first connection line, flow into the first branch line from the coolant line through the second branch line, and be supplied to the battery module connected to the battery coolant line through the first branch line.

4. The system of claim 2, wherein the HVAC module includes an opening and closing door which is provided between the heater and the cooler and is configured to be controlled such that outside air passing through the cooler is selectively flowed into the heater according to cooling, heating, and dehumidification modes of the vehicle.

5. The system of claim 4, wherein:
   the HVAC module further includes an air heater provided at an opposite side of the cooler, with the heater interposed therebetween and configured to selectively heat the outside air passing through the heater; and
   the air heater is configured to be operated to raise a temperature of the outside air passing through the heater when a temperature of the coolant supplied to the heater is lower than a target temperature for interior heating.

6. The system of claim 2, wherein the centralized energy device comprises:
   a condenser configured to circulate a refrigerant therein, provided in the first connection line between a third valve and the heater, condense the refrigerant through heat-exchange between the refrigerant and the coolant, and increase a temperature of the coolant;
   an expansion valve connected to the condenser through a refrigerant line;
   an evaporator connected to the expansion valve through the refrigerant line, provided on the second connection line between the fourth valve and the cooler, and configured to evaporate the refrigerant through heat-exchange between the refrigerant and the coolant, and lower a temperature of the coolant;
   a compressor provided on the refrigerant line between the evaporator and the condenser; and
   an accumulator provided on the refrigerant line between the evaporator and the compressor,
   wherein the chiller is provided on the refrigerant line between the evaporator and the accumulator.

7. The system of claim 6, wherein the condenser is configured to condense the refrigerant by heat-exchanging from the coolant circulating in the first connection line and the refrigerant of a high temperature supplied from the compressor in a heating mode of the vehicle, and supply the coolant of a high temperature to the heater through the first connection line.

8. The system of claim 6, wherein the evaporator is configured to cool the coolant circulating in a cooling mode of the vehicle through the second connection line through heat-exchange with the refrigerant of a low temperature evaporated therein, and supply the coolant of a low temperature to the cooler through the second connection line.

9. The system of claim 6, wherein the battery module is configured to be cooled in a cooling mode of the vehicle, and wherein when cooling the battery module:
- in the cooling apparatus, the first water pump is configured to be operated to circulate the coolant in the coolant line;
- the first valve is configured to be operated to close the second connection line;
- in the battery cooling apparatus, the second valve is configured to be operated to open the first branch line;
- a portion of the battery coolant line connected to the reservoir tank is closed based on the first branch line, and the second water pump is configured to be operated to supply the coolant having passed through the chiller to the battery module along the battery coolant line and the first branch line;
- in the heating apparatus, the third valve is configured to be operated to connect the coolant line and the first connection line such that the coolant is supplied from the cooling apparatus;
- the third water pump is configured to be operated to circulate the coolant along the first connection line;
- in the air conditioner, the fourth valve is configured to be operated to form an independent closed circuit in the second connection line that is independent of the battery coolant line;
- the fourth water pump is configured to be operated to circulate the coolant along the second connection line, and to supply the coolant of a low temperature passing through the evaporator to the cooler; and
- in the centralized energy device, each constituent element is configured to operate such that the refrigerant is circulated along the refrigerant line.

10. The system of claim 6, wherein:
- the coolant circulating the heating apparatus is configured to be supplied to the condenser along the first connection line so that the condenser condenses the refrigerant through heat-exchange with the coolant; and
- the coolant circulating the air conditioner is configured to be supplied to the evaporator along the second connection line so that the evaporator evaporates the refrigerant through heat-exchange with the coolant.

11. The system of a vehicle of claim 6, wherein the battery module is configured to be rapidly charged in a cooling mode of the vehicle, and wherein when rapidly charging the battery module:
- in the cooling apparatus, the first water pump is configured to be operated to circulate the coolant in the coolant line;
- the first valve is configured to be operated to close the second branch line;
- in the battery cooling apparatus, the second valve is configured to be operated to open the first branch line, a portion of the battery coolant line connected to the reservoir tank is closed on the basis of the first branch line, and the second water pump is configured to be operated to supply the coolant having passed through the chiller to the battery module along the battery coolant line and the first branch line;
- in the heating apparatus, the third valve is configured to be operated to connect the coolant line and the first connection line such that the coolant is supplied from the cooling apparatus, and the third water pump is configured to be operated to circulate the coolant along the first connection line;
- in the air conditioner, the fourth valve is configured to be operated to connect the second connection line to the battery coolant line, and the fourth water pump is configured to be operated to supply the coolant from the battery cooling apparatus, and to circulate the coolant along the second connection line; and
- in the centralized energy device, each constituent element is configured to operate such that the refrigerant is circulated along the refrigerant line.

12. The system of claim 6, wherein the heat pump system is configured to recover waste heat of the electrical component in a heating mode of the vehicle, and wherein when recovering the waste heat of the electrical component:
- the first valve is configured to be operated to open the second branch line;
- in the cooling apparatus, on the basis of the second branch line, a portion of the coolant line connected to the radiator and a portion of the coolant line connecting the radiator and the reservoir tank are closed;
- a portion of the first branch line connected to the second branch line is opened, and a remaining portion of the battery coolant line except for the battery coolant line connected to the reservoir tank based on the first branch line is closed;
- the battery cooling apparatus is configured to be stopped;
- the third valve is configured to be operated to form an independent closed circuit in the coolant line and the first connection line;
- the first water pump is configured to be operated to supply the coolant whose temperature is increased while passing through the electrical component to the chiller along the second branch line and a portion of the opened first branch line without passing through the radiator;
- the coolant discharged from the chiller is configured to flow into the reservoir tank through the first branch line and the opened battery coolant line;
- in the heating apparatus, the third water pump is configured to be operated to circulate the coolant along the first connection line;
- in the centralized energy device, each constituent element is configured to operate such that the refrigerant is circulated along the refrigerant line; and
- the air conditioner is configured to be stopped.

13. The system of claim 6, wherein the heat pump system is configured to recover waste heat of the battery module in a heating mode of the vehicle, wherein when recovering the waste heat of the battery module:
- the first valve is configured to be operated to close the second branch line, and the cooling apparatus is configured to be stopped;
- in the battery cooling apparatus, the second valve is configured to be operated to connect the reservoir tank and the battery coolant line, and the first branch line is configured to be opened;
- a portion of the battery coolant line connecting the reservoir tank and the chiller based on the first branch line is closed;
- the second water pump is configured to be operated to supply the coolant passing through the battery module to the chiller along the opened first branch line and the battery coolant line;
- in the heating apparatus, the third water pump is configured to circulate the coolant along the first connection line;
- in the centralized energy device, each constituent element is configured to operate such that the refrigerant is circulated along the refrigerant line; and
- the air conditioner is configured to be stopped.

14. The system of claim 6, wherein in a low temperature dehumidification mode of the vehicle:
the first valve is configured to be operated to open the second branch line;
in the cooling apparatus, on the basis of the second branch line, a portion of the coolant line connected to the radiator and a portion of the coolant line connecting the radiator and the reservoir tank are closed;
the second valve is configured to be operated to open a portion of the first branch line connected to the second branch line is opened, and to close a remaining portion of the battery coolant line except for the battery coolant line connected to the reservoir tank based on the first branch line;
the battery cooling apparatus is configured to be stopped;
the third valve is configured to be operated to form an independent circuit in the coolant line and the first connection line;
the first water pump is configured to be operated to supply the coolant whose temperature is increased while passing through the electrical component to the chiller along the second branch line and a portion of the opened first branch line without passing through the radiator;
the coolant is configured to be discharged from the chiller and flow into the reservoir tank through the first branch line and the opened battery coolant line;
in the heating apparatus, the third water pump is configured to be operated to circulate the coolant along the first connection line;
in the centralized energy device, each constituent element is configured to operate such that the refrigerant is circulated along the refrigerant line; and
in the air conditioner, the fourth water pump is configured to be operated to circulate the coolant along the second connection line.

15. The system of claim 6, wherein in a high temperature dehumidification mode of the vehicle:
the first valve is configured to be operated to close the second branch line;
in the cooling apparatus, the first water pump is configured to circulate the coolant in the coolant line;
the second valve is configured to be operated to close the battery coolant line and the first branch line, and the battery cooling apparatus is configured to be stopped;
in the heating apparatus, the third valve is configured to be operated to connect the coolant line and the first connection line such that the coolant is supplied from the cooling apparatus, and the third water pump is configured to be operated to circulate the coolant along the first connection line;
in the centralized energy device, each constituent element is configured to operate such that the refrigerant is circulated along the refrigerant line; and
in the air conditioner, the fourth water pump is configured to circulate the coolant along the second connection line.

16. The system of claim 1, wherein the electrical component and the battery module are configured to be cooled using the coolant, and wherein when cooling the electrical component and the battery module:
the first valve is configured to be operated to close the first branch line;
the second valve is configured to be operated to close the second branch line;
the first water pump is configured to be operated to supply the coolant cooled in the radiator and stored in the reservoir tank to the electrical component; and
the second valve is configured to be operated to supply the coolant stored in the reservoir tank to the battery module while circulating through the battery coolant line connected to the coolant line.

17. The system of claim 1, wherein the system is configured to use waste heat of the electrical component without an operation of the centralized energy device in a heating mode of the vehicle, and wherein when using the waste heat of the electrical component:
the first valve is configured to be operated to open the second branch line;
in the cooling apparatus, on the basis of the second branch line, a portion of the coolant line connected to the radiator and a portion of the coolant line connecting the radiator and the reservoir tank are closed;
a portion of the first branch line connected to the second branch line is opened, and a remaining portion of the battery coolant line except for the battery coolant line connected to the reservoir tank based on the first branch line is closed;
the battery cooling apparatus is configured to be stopped;
the first water pump is configured to be operated to supply the coolant whose temperature is increased while passing through the electrical component to the heater along the first connection line connected through a third valve;
the coolant discharged from the heater is configured to be supplied to the chiller along the first connection line, a third valve, the coolant line, the second branch line, and a portion of the first branch line without passing through the radiator; and
the coolant discharged from the chiller is configured to flow into the reservoir tank through the first branch line and the opened battery coolant line.

18. The system of claim 1, wherein:
the heating apparatus further includes a coolant heater provided on the first connection line between the third water pump and the heater; and
in a heating mode, or in a low temperature dehumidification mode, the coolant heater is configured to be operated when a temperature of the coolant supplied to the heater is lower than a target temperature or when the battery module is heated.

19. The system of claim 1, wherein the centralized energy device comprises:
a condenser provided in the first connection line between a third valve and the heater and configured to circulate a refrigerant therein, condense the refrigerant through heat-exchange between the refrigerant and the coolant, and increase a temperature of the coolant;
a first expansion valve connected to the condenser through a refrigerant line;
an evaporator connected to the first expansion valve through the refrigerant line, provided on the second connection line between the fourth valve and the cooler, and configured to evaporate the refrigerant through heat-exchange between the refrigerant and the coolant, and lower a temperature of the coolant;
a compressor provided on the refrigerant line between the evaporator and the condenser; and
an accumulator provided on the refrigerant line between the evaporator and the compressor,
wherein the chiller is provided on a refrigerant connection line, a first end of the refrigerant connection line is connected to the refrigerant line between the condenser and the first expansion valve, and a second end of the refrigerant connection line is connected to the accumulator.

20. The system of claim 19, wherein:

the chiller is connected in parallel with the refrigerant line through the refrigerant connection line; and a second expansion valve is provided on the refrigerant connection line and configured to expand while selectively controlling an inflow of the refrigerant to the chiller.

* * * * *